(12) United States Patent
Parker

(10) Patent No.: US 7,266,767 B2
(45) Date of Patent: Sep. 4, 2007

(54) METHOD AND APPARATUS FOR AUTOMATED AUTHORING AND MARKETING

(76) Inventor: Philip M. Parker, 12874 Harwick La., San Diego, CA (US) 92130

( * ) Notice: Subject to any disclaimer, the term of this patent is extended or adjusted under 35 U.S.C. 154(b) by 0 days.

(21) Appl. No.: 11/261,631

(22) Filed: Oct. 31, 2005

(65) Prior Publication Data

US 2006/0064631 A1 Mar. 23, 2006

Related U.S. Application Data

(63) Continuation of application No. 09/723,522, filed on Nov. 27, 2000, now abandoned.

(51) Int. Cl.
*G06F 17/00* (2006.01)
(52) U.S. Cl. ...................... 715/517; 715/523
(58) Field of Classification Search .................. 706/45; 715/500, 513, 517, 523; 707/3
See application file for complete search history.

(56) References Cited

U.S. PATENT DOCUMENTS

| | | | |
|---|---|---|---|
| 3,781,816 A | 12/1973 | Coleman et al. | |
| 4,881,197 A | 11/1989 | Fischer | |
| 5,133,051 A | 7/1992 | Handley | |
| 5,261,601 A | 11/1993 | Ross et al. | |
| 5,349,648 A | 9/1994 | Handley | |
| 5,453,570 A | 9/1995 | Umeda et al. | |
| 5,649,186 A | 7/1997 | Ferguson | |
| 5,670,999 A | 9/1997 | Takeuchi et al. | |
| 5,715,866 A | 2/1998 | Granger | |
| 5,743,252 A | 4/1998 | Rusamen et al. | |
| 5,745,678 A | 4/1998 | Herzberg et al. | |
| 5,865,185 A | 2/1999 | Collins et al. | |
| 5,934,289 A | 8/1999 | Watkins et al. | |
| 5,966,386 A | 10/1999 | Maegawa | |
| 6,012,098 A | * 1/2000 | Bayeh et al. | 709/246 |
| 6,026,417 A | * 2/2000 | Ross et al. | 715/517 |
| 6,026,809 A | 2/2000 | Abrams et al. | |
| 6,029,182 A | 2/2000 | Nehab et al. | |
| 6,029,195 A | 2/2000 | Herz | |
| 6,052,717 A | 4/2000 | Reynolds et al. | |
| 6,154,213 A | 11/2000 | Rennison et al. | |
| 6,374,271 B1 | 4/2002 | Shimizu et al. | |
| 6,393,196 B1 | 5/2002 | Yamane et al. | |
| 6,393,388 B1 | * 5/2002 | Franz et al. | 704/4 |

(Continued)

OTHER PUBLICATIONS

"eTranslate Joins Forces With MSN LinkExchange to Help Small Businesses Reach International Audience on the Web" Aug. 30, 1999 http://www.microsoft.com/presspass/press/1999/aug99/etranslatepr.mspx.*

(Continued)

*Primary Examiner*—Stephen Hong
*Assistant Examiner*—Adam M Queler
(74) *Attorney, Agent, or Firm*—Andrew D. Skale, Esq.

(57) ABSTRACT

The present invention provides for the automatic authoring, marketing, and/or distributing of title material. A computer automatically authors material. The material is automatically formatted into a desired format, resulting in a title material. The title material may also be automatically distributed to a recipient. Meta material, marketing material, and control material are automatically authored and if desired, distributed to a recipient. Further, the title material may be authored on demand, such that it may be in any desired language and with the latest version and content.

17 Claims, 13 Drawing Sheets

U.S. PATENT DOCUMENTS

| | | | | |
|---|---|---|---|---|
| 6,453,280 | B1* | 9/2002 | Yang | 704/10 |
| 6,453,459 | B1 | 9/2002 | Brodersen et al. | |
| 6,473,096 | B1 | 10/2002 | Kobayashi et al. | |
| 6,628,303 | B1 | 9/2003 | Foreman et al. | |
| 6,633,877 | B1 | 10/2003 | Saigh et al. | |
| 6,636,648 | B2* | 10/2003 | Loui et al. | 382/284 |
| 2002/0040374 | A1* | 4/2002 | Kent | 707/516 |
| 2002/0152215 | A1* | 10/2002 | Clark et al. | 707/10 |
| 2003/0079177 | A1* | 4/2003 | Brintzenhofe et al. | 715/500 |

OTHER PUBLICATIONS

Bott, Special Edition Using Microsoft Windows Millennium Edition, Published Nov. 3, 2000, Que, Chapter 25.* http://web.archive.org/web/19981206070001/http://www.yournovel.com/index.html, pp. 1-2 (printed on Feb. 7, 2006).

http://web.archive.org/web/19981205050914/www.yournovel.com/other.html, pp. 1-2 (printed on Feb. 7, 2006).

http://web.archive.org/web/19990420200431/www.yournovel.com/order.html, pp. 1-5 (printed on Feb. 7, 2006).

http://web.archive.org/web/19990225080134/www.yournovel.com/fag.html, pp. 1-2 (printed on Feb. 7, 2006).

http://web.archive.org/web/19981207011801/www.yournovel.com/review.html, p. 1 (printed on Feb. 7, 2006).

http://web.archive.org/web/19990420222307/www.yournovel.com/review1.html, pp. 1-5 (printed on Feb. 7, 2006).

http://web.archive.org/web/19990420232229/www.yournovel.com/review2.html, pp. 1-2 (printed on Feb. 7, 2006).

http://web.archive.org/web/19981205092553/www.yournovel.com/novels.html, pp. 1-3 (printed on Feb. 7, 2006).

Tidwell, "Why Visual Basic for Applications (VBA) Should be in your Curriculum," http://www.course.com/techtrends.visualbasic_052000.cfm, May 1, 2000.

"ONIX explained," http:/www.netread.com/onix/, Nov. 10, 2000.

Ardissono, et al., "Exploiting user models for personalizing news presentations," http://wwwis.win.tue.nl/asum99/ardissono/ardissono.html, published May 14, 1999.

Galloway, "Electronic Portfolios," http://www.iun.edu/~galloway/ep.doc, published Jan. 7, 2000.

"Atlas of the Future," The Macmillan,. p. 36, 1998.

"Talking to the World," The Economist, pp. 83-85, 1999.

http://www.tlcdelivers.com/tlc/crs/lcri0122.htm, Nov. 20, 2000.

http://publishing.about.com/arts/publishing/library/weekly/aa032600a.htm, pp. 1-2, Nov. 26, 2000.

* cited by examiner

METHOD AND APPARATUS FOR AUTOMATED AUTHORING AND MARKETING

CROSS-REFERENCE TO RELATED APPLICATIONS

This application is a continuation of U.S. application Ser. No. 09/723,522, filed Nov. 27, 2000, now abandoned, which is herein incorporated by reference in its entirety.

BACKGROUND

1. Field of Invention

The present invention relates to automatic authoring and marketing, and more particularly to a method and apparatus for authoring, marketing, and/or distributing title materials automatically by a computer.

2. Description of the Prior Art

The commercial publishing and media industries traditionally comprise a number of discrete entities which ultimately make title materials available to an end-user. This disintegrated process involves a number of phases which, by their nature, incur substantial labor, material and organizational costs.

Manually authoring a work, such as non-fiction and fiction works, often requires months, or even years of costly labor. Further, many manually authored materials are prone to errors, especially in cases where the work involves a large number of numerical values which may be based on a plurality of calculations, includes extensive tabular information, or includes a large number of graphic illustrations. Given the need to recover the costs of high labor inputs, manually authored works are often economically viable only when there exists a sufficiently large number of buyers to recover the costs of development and marketing of the work. Given the complexities of some subjects, the publication of some materials are not economically viable. Such subjects include, for example, materials that involve a large number of numerical entries or calculations, the reporting of a large number of calculations in tabular or other formats, or graphical or audio representations embedded within materials. Traditionally, the larger the number of such complexities, the higher the cost of developing materials.

Additionally, the publication or production process of materials is often undertaken by a separate entity, thereby increasing the total labor costs associated with providing the materials to an end-user. The publishing and production processes for material traditionally involves packaging, formatting, promotion, distribution and the like. This process also traditionally involves substantial labor inputs and is prone to human error.

Once a work is authored, the work encounters laborious editing and formatting. These processes often include general editing, spell checking, grammar checking, sentence re-writing, graphics editing, text formatting, video editing, dubbing, audio editing, changing layout designs, and the like. The existence of tables and graphics in the title material further slow this process. In addition to being prone to human error, the typesetting/developing, editing and formatting processes take several months time.

After the work is polished, edited or formatted in an appropriate manner, the publishing and media industries use separate entities or persons to handle the marketing or promotion and the distribution of the work. This separation of tasks incurs additional costs based on persons who are neither the authors nor the editors of the work. Once the work is authored and edited, it is marketed using various means, including press releases, cataloging in various databases (using meta files), direct mail brochures, email announcements, video releases, audio releases, banners, billboards, and Internet web pages, among others. Many months of labor is traditionally used in the preparation and the distribution of these marketing and promotional materials. Additionally, human marketers must find the appropriate audience to send press releases, brochures, or similar marketing materials. In addition to creating the marketing materials, the human marketer spends time researching the appropriate target market of individuals who should receive the marketing materials.

Further, when such works are ordered or requested, it is traditionally fulfilled using an inventory of existing stock that has been pre-printed or produced in either electronic or non-electronic format. Therefore, if a new edition is required, many of the costs associated with the first edition of the material are again incurred. Furthermore, if a recipient, such as a distributor or an end-user, requests a specific form of the material, or a customized version of the material that might omit or augment the content, this customization takes many months time and added costs.

If a version of the title material is desired in a language other than that of the original material, the author or publisher will send the material to language translators who may require many months time to completely translate the material. If a version of the title material is physically or electronically incompatible with a given seller's method of distribution, the material is often reformatted at high costs in labor and/or materials. If a series of a version of the title material is desired across pre-defined units such as time, geographical area, corporate entity, genre, or methodology, substantial costs are traditionally incurred for each member of the series, or plurality of series making up the body of the materials.

At least one recent source has opined that it would not be until year 2017 that a computer "creates original text documents." *The Macmillan Atlas of the Future* 36 (Ian Pearson ed., Macmillan Books 1998). Additionally, a recent article noted that "[w]hat we now call 'hard copy' has continued essentially unchanged since Guttenberg. Letters are still written, books bound, newspapers—mostly—printed and distributed much as they ever were." *Talking to the World, The Economist,* Dec. 31, 1999, at 83-85. Therefore, there is a need for a method and apparatus for authoring, marketing, and/or distributing title materials automatically by a computer. Further, there is a need for an automated system that eliminates or substantially reduces the costs associated with human labor, such as authors, editors, graphic artists, data analysts, translators, distributors, and marketing personnel. Moreover, there is a need for an automated system that allows title materials to be quickly authored, marketed, and/or distributed as the latest possible edition of the material and in the format and written language of the end-user's choice.

SUMMARY OF THE INVENTION

An embodiment of the present invention allows a computer to produce a plurality of original computer authored title materials and also distribute, control, and market such title materials. A computer authors the title material in such a manner so as to eliminate the need for manually authoring and/or editing the material. The title material is indexed automatically. Marketing and promotional material is automatically authored for the title material. Further, the marketing of promotional material may be automatically distributed. Additionally, the title material may be automatically translated into any language and the title material may be available in its latest version upon request.

An embodiment of the present invention may be implemented using a computer, such as a single or plurality of adequately equipped desk top, laptop or similar computers. Further, the faster the speed of the computer used, the faster title materials may be authored, distributed, and/or marketed under the present invention.

Advantageously, an embodiment of the present invention decreases the costs associated with the authoring, editing, marketing, distribution, translation, reformatting, copyrighting, and last-edition fulfillment of title materials. Additionally, an embodiment of the present invention further significantly reduces the amount of time required to author an original full-length material to a matter of minutes and/or seconds for any genre of title material, including fiction or non-fiction material, whether in unique or serial form.

Advantageously further, an embodiment of the present invention automatically authors title material; automatically authors title materials in a plurality of languages other than the original material; automatically authors marketing and promotional materials for the title material; automatically distributes title material, descriptive meta material, control materials, and/or marketing materials; automatically catalogues the title material; automatically indexes the title material; automatically updates the title material to the latest edition or any previous editions on demand; automatically matches materials to distribution meta and marketing material to more efficiently target information to appropriate channels of distribution, target audiences, end-users, sellers or recipients; and automatically produces title material of a high level of complexity.

Further features and advantages of the invention as well as the structure and operation of various embodiments of the invention are described in detail herein with reference to the accompanying drawings.

BRIEF DESCRIPTION OF THE DRAWINGS

The present invention will be described with particular embodiments thereof, and references will be made to the drawings in which.

DETAILED DESCRIPTION OF THE INVENTION

Figure 1:
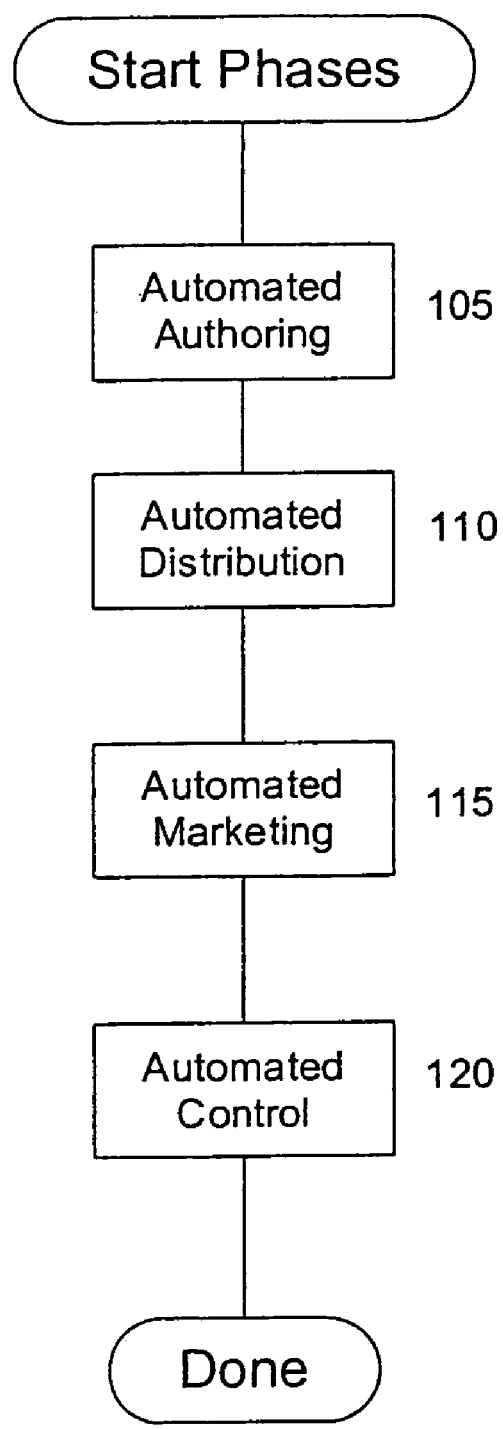
FIG. 1 illustrates a flow diagram of an embodiment of the present invention.

The present invention provides a method, system and apparatus for automatically authoring, editing, distributing, marketing, controlling and publishing title materials. While the invention allows for the elimination of substantial human effort at any phase of the process described herein, human intervention may occur such that that process may be completed manually.

Materials, as used herein, includes any information and data capable of being used in a title material, for example, but not limited to, text, audio, video, descriptive, tabular, artistic, and/or graphical information.

Title material, as used herein includes a publishable and/or authored work, such as literary works, serial publications, theatrical plays, books, including fiction and non-fiction works (for example, but not limited to, reference books, market research reports, travel guides, company competitive analyses, industry reports, company reports, management consulting reports, technical documents, and the like), newsletters, magazines, computer instructions, software, software publications, Internet publications, computer-based content, Internet web sites, musical scores, screen plays, video productions, holographic or 3-d works, virtual reality works, and the like. Alternatively in an embodiment, title material includes any work that is capable of being associated with a unique identification alpha-numeric code, for example a unique alpha-numeric identifier that is used to identify the work or a catalog number. Alternatively still in another embodiment, title material includes any work that is capable of being associated with a unique alpha-numeric codes, such as an ISBN (International Standard Book Number), ISSN (International Standard Serial Number), a UPC (Uniform Product Code), a library number (such as the Library of Congress identifier), a bar code, an item number, an SKU (Stock Keeping Unit), a number code, a caselaw number, a docket number, an abstract number, a year of publication, a chapter code, and the like. Alternatively still in another embodiment, title material includes any authored or published work that is to be commercially available. In a further embodiment, a title material includes any work with an alpha-numeric numbering system that is observable or intended to be observable within the public domain. In an embodiment of the present invention, a work is considered published if any of the unique alpha-numeric codes mentioned herein are associated with the work.

Marketing material, as used herein, includes information used to market, disseminate knowledge of, or promote title material. Marketing materials publicize or announce title materials to various audiences, including remote servers that post electronic announcements. Marketing material includes, but is not limited to, public relations works, press releases, product announcements, brochures, flyers, billboards or outdoor copy, video, audio, magazine or print media copy, emails, banners, displays or similar materials.

Meta material, as used herein, includes materials used to describe title material. Meta materials may be used in the publishing and media industries to catalogue and/or promote title material. Meta materials describe title material to publishers, resellers, distributors, industry associations, industry organizations, government organizations, or end-users such as libraries or individuals. Further, meta materials may include text, graphics, numerical data, coverings (such as a book jacket, a CD jacket, videotape jacket, or the like) or other information that is used to describe the title material. Additionally, meta material may include, but is not limited to, information regarding the price of the title material, the length in pages or time of the title material, the language of the title material, the physical or electronic format of the title material, the binding or packaging of the title material, an abstract of the title material's content, an alpha-numeric identification number of the title material, subject codes or text of the title material, comments from the author of the title material, comments from the publisher of the title material, credits related to the title material, endorsements of the title material, reviews of the title material, a table of contents of the title material, date of publication of the title material, place of publication of the title material, name of the publisher or producer of the title material, address of the publisher or producer of the title material, or the like. Further, meta material includes meta files and/or metadata.

Control material, as used herein, includes any information used to control, track, index or account for title material. Control material includes, but is not limited to, items in meta, title or marketing materials, but may also include information used for inventory control, billing, financial accounting, stock keeping, information relating to the target audience, and cataloguing information used for internal control.

Database files, as used herein, includes forms, modules, queries, macros, reports, tables, templates, graphics, automation programs, audio and video files, data files, material files, information in a database, document files, and the like.

A genre, as used herein, is a group or series of title materials having common characteristics or using similar procedures to be authored. Genres include, for example, a series of market research reports having similar formats, logical statements, calculations, graphics, or patterns with different content for each title material within the genre. A genre of materials may include multiple materials having similar characteristics.

A recipient, as used herein, includes any individual, entity, computer, or the like, that is capable of receiving title, meta, marketing, and/or control materials authored by the present invention. For example, a recipient may include a distributor or an end-user of the title material.

A user, as used herein, includes any individual, entity, computer, or the like, that is using the system of the present invention to automatically author, distribute, and/or market title materials.

An end-user, as used herein, includes any individual, entity, computer, or the like, that is to be the ultimate consumer of the title material.

A system of networked computers as used herein by the system of the present invention may be any system of multiple computers that are directly or indirectly interconnected by any types of electronic connections, including connections via hardwire, Ethernet, token ring, modem, digital subscriber line, cable modem, wireless, radio, satellite, and combinations thereof. Such connections may be implemented using copper wire, fiber optics, radio waves, coherent light, or other media. The system of networked computers may be the Internet, an intranet, a secure virtual private network (VPN), or any other system of computers that are interconnected by electronic connections. As used herein, the term "network" refers to any such system of networked computers, including the Internet. Likewise, as used herein, the expression "providing a system of networked computers" means creating a network specifically for the purpose of facilitating the present invention or simply connecting to an existing network for the purpose of facilitating the present invention.

A computer, as used herein, includes any general-purpose machine that processes data according to a set of instructions that is stored internally either temporarily or permanently, including, but not limited to, a general purpose computer, workstation, laptop computer, personal computer, set top box, web access device (such as WEB TV™ (Microsoft Corporation)), cable television, satellite television, broadband network, an electronic viewing or listening device, any other type of computer, wireless devices, such as a personal digital assistant (PDA), cellular or mobile telephones, electronic handheld units for the wireless receipt and/or transmission of data, such as a BLACKBERRY™ (Research In Motion Limited Corporation), or the like.

In an embodiment, to author or authoring, as used herein, is to create an original work of authorship fixed in any tangible medium of expression, now known or later developed, from which it can be perceived, reproduced or otherwise communicated, either directly or with the aid or a machine or device. Works of authorship include title materials, such as literary works; musical works, including the lyrics; dramatic works, including any accompanying music; pictorial or graphical works; motion pictures and other audiovisual works; sound recordings; and any compilations and/or derivative works or the work of authorship; and other materials.

As the present invention allows for the sequential and uninterrupted batching for a virtually unlimited number of genres or title materials, it should be understood that terms such as "material", "title material", "file", "macro", "module", "template", "database file", "system", "computer", "automation program", "query", "form", "interface", "recipient", "manuscript", "book", and the like, should be considered in both singular and plural forms. As used herein, the word "material" without a preceding adjective should imply all forms of material, including title material, meta material, marketing material, control material, and/or any material used to generate such material.

FIG. 1 illustrates a flow diagram of an embodiment of the present invention. In step 105, materials are automatically authored using various processes as described herein. In step 110, materials are automatically distributed to various recipients. Examples of such recipients include, for example if distributing a book, title material, marketing material, meta material and control materials, may be resellers such as AMAZON.COM™ (Amazon.com, Inc.), BARNES AND NOBLE™ (Barnes and Noble Bookstores, Inc.), BN.COM™ (Barnes and Noble College Bookstores, Inc.), DIALOG™ (Dialog Information Services, Inc.), or the like. Recipients may further include individuals, printing companies, or remote computers. Step 110 further includes various systems that automate this process. In step 115, the materials are automatically marketed or promoted. Marketing materials may be both authored and distributed in this process. Step 120 includes automatically authoring index and control materials. Such control materials may be used to track materials such as for accounting, logistics, or administrative purposes. While the steps in FIG. 1 are shown in a certain order, these steps may occur in any order deemed necessary by the user.

Figure 2:
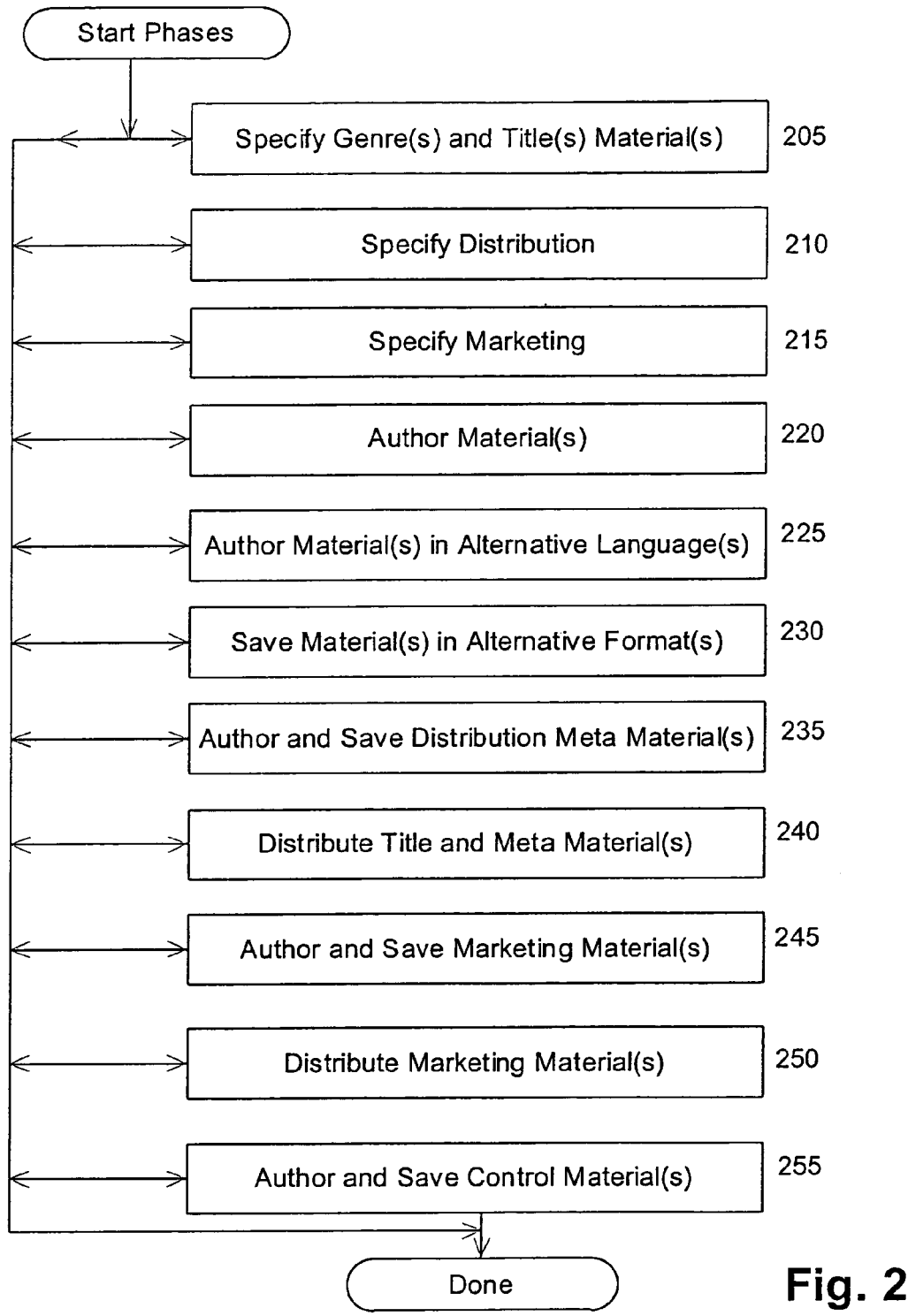
FIG. 2 illustrates a flow diagram of an embodiment of the present invention.

FIG. 2 illustrates a summary flow diagram of an embodiment of the present invention. Automatically authoring material under the present invention may start by first making various selections. Steps 205 to 255 shown in FIG. 2, illustrate various steps that a user may select to have the system of the present invention perform. These steps may occur in any order desired by the user, illustrated by the double arrows coming in and out of each of the steps 205 to 255.

In step 205, a user specifies title material(s) within a genre. In step 210, a user specifies the distribution requirements, including the authoring requirements for meta materials and for the title material(s). In step 215 the user specifies the marketing material to be authored and distributed. Additionally, if default information is provided to the system, any or all of the steps in FIG. 2 may be completed automatically, without human intervention.

The outputs of steps 205, 210, and 215 may be recorded in a table or other database file, to be used by other processes that follow. The user of the embodiment of the present invention need not be human, for example the computer may auto start and run on default values. However, human intervention may be considered at any phase of the process should the user so choose.

At 220, the system automatically authors title, meta, marketing, and/or control material. The material authored may be for a series of genres or titles within genres in a single or a high-volume batched process. If specified by the user, at 225 the material is automatically translated into any language, such as any spoken or written language.

Recipients of the material may desire the material to be in certain formats, such as electronic, non-electronic, formatted for a specific word processor, or the like. Step 230 automatically saves the materials in the format specified by the user. Step 235 automatically authors and saves meta materials. At 240 meta materials is automatically distributed. At 245 marketing material is automatically authored and saved, wherein the marketing material may be specified by the user. Step 250 automatically distributes the marketing materials. At 255, the control materials are automatically authored and saved. The control materials may be automatically distributed to recipients specified by the user.

While the sequence presented in FIG. 2 is illustrated in a certain order, this does not imply that the order be adhered to implement the present invention; the present invention may implement some or all of the steps in FIG. 2 in any order the user desires. For example, the step of automatically authoring marketing materials 245 may occur prior to authoring title materials 205. For example, this may occur in the book publishing industry where publishers pre-announce and promote a title before it is authored.

Figure 3:
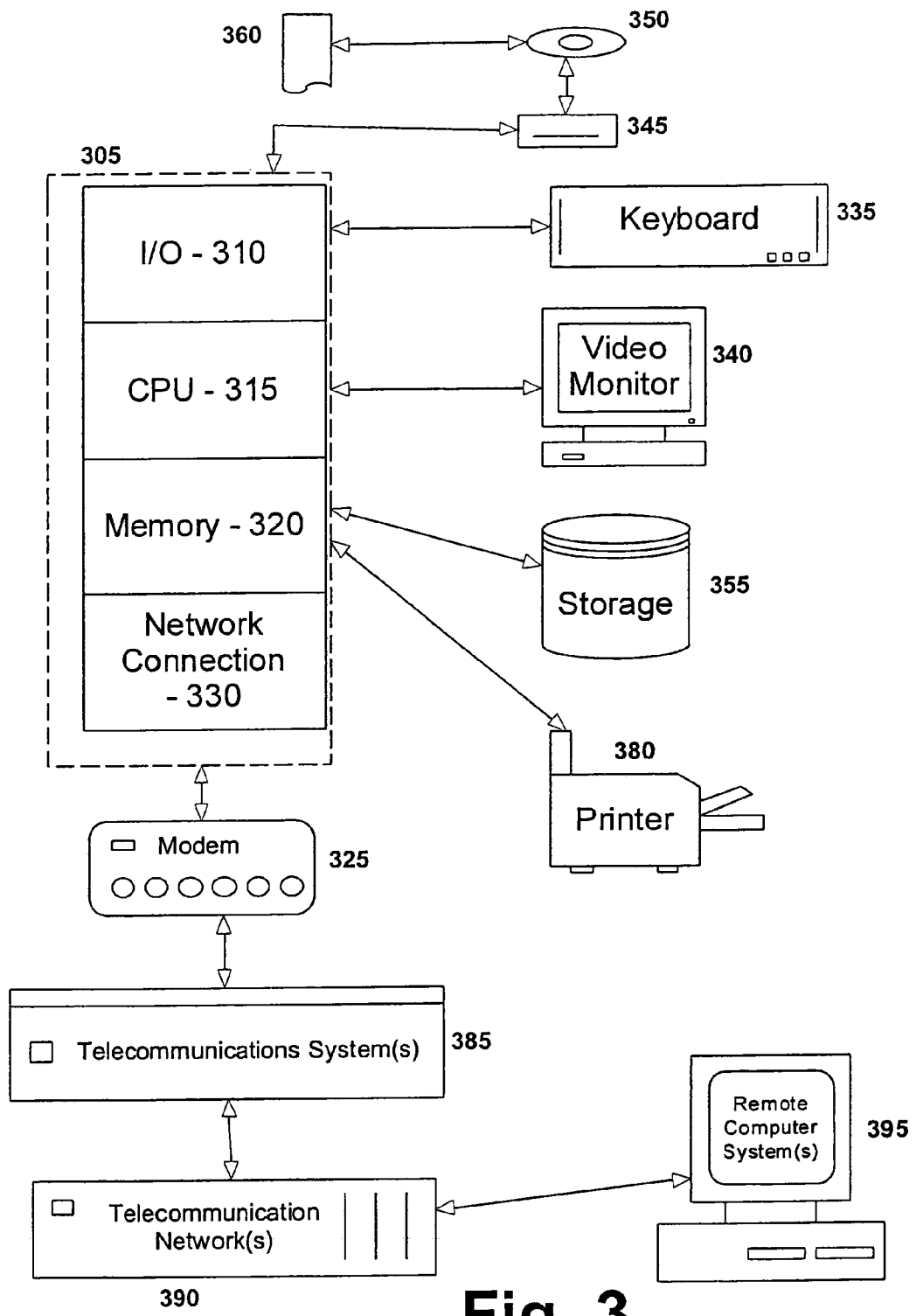
FIG. 3 illustrates a portion of a computer, including a CPU, conventional memory, and communications hardware in which the present invention may be embodied.

FIG. 3 illustrates a portion of a computer system, including a CPU, conventional memory, and communications hardware in which the present invention may be embodied. Some of the elements in FIG. 3 shown include a processor 305 having an input/output (I/O) section 310, a central processing unit (CPU) 315, a memory section 320, a communications modem 325, and a network connection 330, connected to a keyboard 335, a display unit 340, a storage disk 355 such as a database, a CD-ROM or similar unit 345. The CD-ROM unit may read a CD-ROM or similar medium 350, which typically contains programs and data 360. A printer 380 may connect to processor 305. A telecommunications system 385 may be connected to the system via modem 325 or other communications device. This would allow the system to connect to a telecommunication network 390, such that the system may connect to a remote computer system 395. The present invention may work on a single or plurality of computers as shown in FIG. 3 and may be locally or remotely operated.

Figure 4:
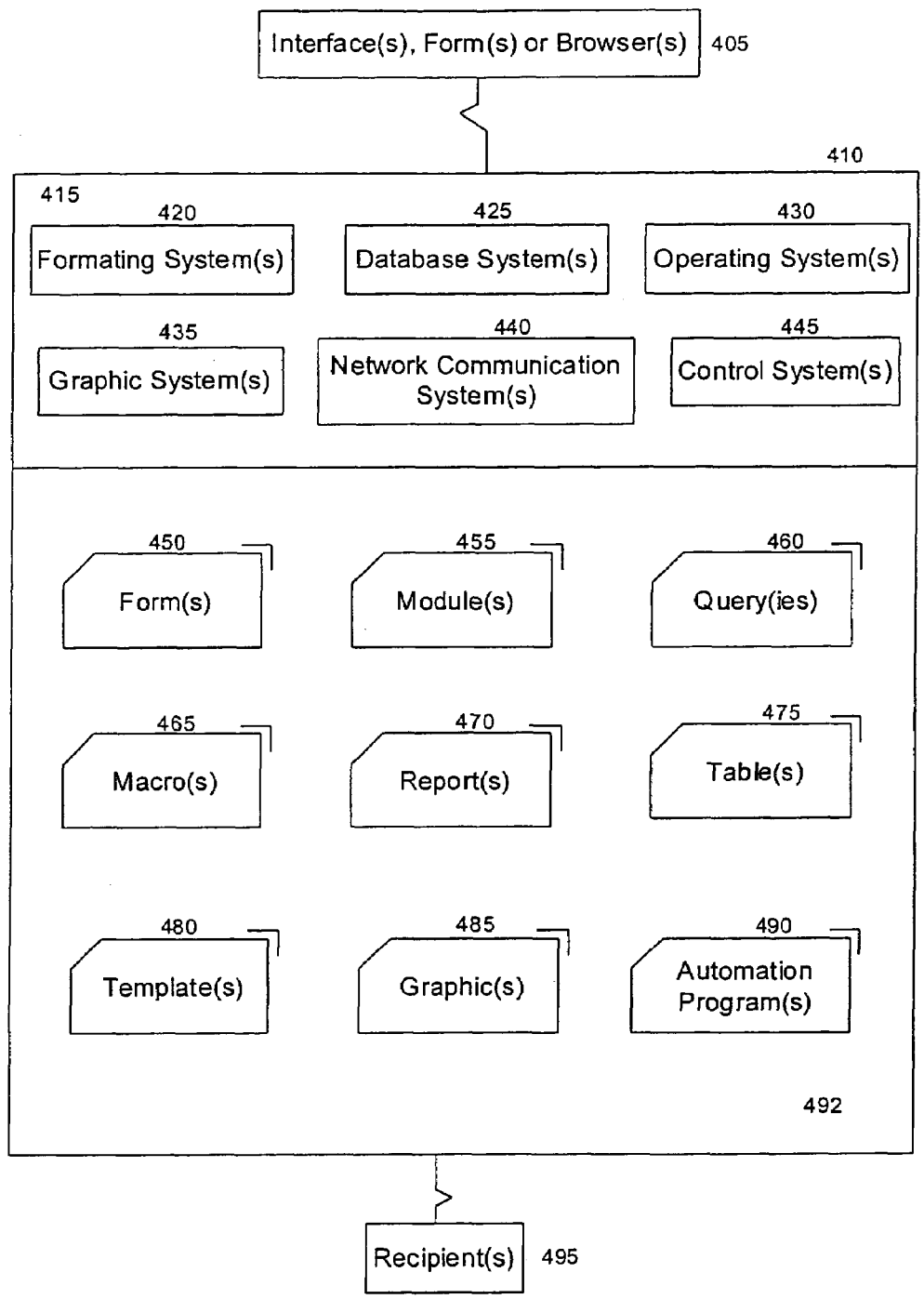
FIG. 4 illustrates a block diagram of an embodiment of the present invention.

FIG. 4 illustrates a block diagram of an embodiment of the present invention. This embodiment shows how the system may be accessed via an interface, form or browser 405 that may be operated on a local or remote computer. The interface allows for interaction between the user and the computer 410 which allows for further interaction with recipients. The embodiment may make use of a variety of software packages 415, including software packages that are commercially available, customized by a user, or created by a user. Software packages 415 include: an operating system 430 such as UNIX™ (UNIX System Laboratories, Inc.), MICROSOFT WINDOWS™ (Microsoft Corp.), LINUX™ (Torvalds, Linus), or similar systems; one or more database systems 425 such as MICROSOFT ACCESS™ (Microsoft, Corp.), ORACLE™ (Oracle Corporation), or similar software packages; one or more material formatting software packages or database systems 420 such as MICROSOFT WORD™ (Microsoft Corp.), WORD PERFECT™ (Word-Perfect Corporation), CRYSTAL REPORTS™ (Seagate Software, Inc.), COREL VENTURA PUBLISHER™ (Corel Corp.), MICROSOFT FRONT PAGE™ (Microsoft Corp.), PAGEMAKER™ (Adobe Systems Incorporated), QUARK™ (Quark, Inc.), DREAMWEAVER™ 3.0 (Macromedia, Inc.), LUMIERE VIDEO STUDIO™ 2.0 (International Microcomputer Software, Inc.), MGI VIDEOWARE II™ MGI Software, Corp.), SOUND FORGE™ 4.5 (Sonic Foundry, Inc.), WAVELAB™ 3.0 (Steinberg North America, Inc.), DIGITAL ORIGIN EDIT DV™ 2.0 (Digital Origin, Inc.), ADOBE PHOTOSHOP™ 6.0 (Adobe Systems, Inc.), or similar packages; one or more graphic software packages 435 such as the packages mentioned herein, multi-media software, ADOBE PHOTOSHOP™ (Adobe Systems Incorporated), QUARK™, or similar software packages; one or more network communications packages 440 which may electronically transfer files from one computer to another using file transfer protocols or similar systems, including browsers or similar software packages, and one or more control systems 445 that allow for the tracking of materials and processes completed, including the software mentioned herein, spreadsheet programs such as MICROSOFT EXCEL™ (Microsoft Corp.), or accounting software packages such as PEACHTREE™ (Peachtree Software, Inc.). Interaction with the various databases can use SQL (Structured Query Language) or any other such language to interrogate and process data in a databases and/or relational database.

Database files 492 may be used to help author title materials according to an embodiment of the present invention. Database files 492 include forms 450, modules 455, queries 460, macros 465, reports 470, tables 475, templates 480, graphics 485, automation programs 490, audio and video files, data files, information in a database, material files, and the like. This information may be contained in one or more databases saved in a file format compatible with and exploitable by one or more database software packages 425. For example, a database may be defined as a collection of information that is related to one or more genres or titles that include, for example, database files 492. Therefore, database files 492 may access material found in other database files 492.

Within one or more database files, data may be divided into separate storage containers called tables 475 which may be viewed, added to, and updated using forms 450, queries 460 or other methods. Information may be retrieved and analyzed using queries 460 which may be organized into reports 470.

A form 450 is a structured material with spaces reserved for entering information via any number of methods including, for example, drop boxes, list boxes, text boxes, combo boxes, or selection boxes. Modules 455 are defined as a collection of programming declarations and procedures that are stored together as a unit. Modules may be programmed in any number of computer languages such as VISUAL BASIC FOR APPLICATIONS™ (Microsoft Corp.), TURBO PASCAL™ (Borland International, Inc.), Fortran, Cobol, C, Pascal, C++, or the like, and may comprise form modules associated with particular forms 450, report modules associated with particular reports 470, or standard modules containing general procedures that may not be associated with any other object that may be run from anywhere within a database or computer 410. Modules may contain event procedures that run in response to an event on the form or report or that control the behavior of forms, reports, objects, or other software systems and packages. Modules may also run in response to a user action, such as clicking the mouse on a command button or selecting a specification option. Modules may comprise function procedures which may return calculated values, or sub procedure(s) which carry out an operation without returning a value.

A query 460 is a method of retrieving, sorting, viewing, changing, or analyzing data in different ways. Queries may be used to retrieve or be the source of data, information, graphics, audio material, video material or records for forms, reports, or other systems. Queries can be programmed in any number of computer languages, such as SQL (Structured Query Language).

A macro 465 is a set of one or more actions that perform a particular operation, such as opening a form, running queries, and/or printing a report. Macros may automate common tasks. For example, a macro that prints or outputs material may be run when a user clicks a command button or selects a specification option. For example, a macro may be one macro comprised of a sequence of actions or it may be a macro group of related macros allowing easier management of the database(s) or computer 410. Macros may be programmed in any number of computer languages such as VISUAL BASIC FOR APPLICATIONS™, TURBO PASCAL™, Fortran, Cobol, C, Pascal, C++, or the like, and may comprise a variety of expressions including conditional expressions which determine whether an action will be performed when a macro runs. Macros can automate repeated tasks, or may be used to avoid manually performing a series of time-consuming, repetitive actions. Further, macros may perform multiple tasks that involve the authoring, editing and formatting of material. Modules and macros may reside in or act upon software packages 415 and/or automation programs 490. Modules and macros may also be used to speed up system editing and formatting. Additionally, modules and macros may be used to combine multiple commands, for example, inserting a table with a specific size and borders, and with a specific number of rows and columns, to make an option in a dialog box more accessible, or to automate a complex series of tasks including the authoring of graphics, audio and video material.

A report 470 is a way to present data or information in a desired format. Data or information presented in a report may be generated from one or more queries 460, modules 455 or macros 465. A variety of information may be stored in a report, including codes for headings, titles, blocks of text, variables to be acted upon by a module or macro, or similar types of variables.

A table 475 is a collection of information or data, for example, but not limited by, text, numbers, symbols, graphics, audio objects, video objects or similar objects, items or sub sheets organized into columns (which may be called fields) and rows (which may be called records). A tables may include common fields relating two or more tables. A table may be directly or indirectly accessed, viewed, or edited. Further, a table may be permanent, or temporarily authored within the material automation process. Also, a table may be two dimensional, three dimensional or "n" dimensional or relational in nature. The association between elements within and across tables need not be deterministic, wherein it may be probabilistic or use fuzzy logic.

Templates 480, like forms, are used to define the basic structure of material and may contain various settings, macros, tables, information or modules. Such settings include automatic text entries (information used on a repeated or stored basis, including boiler plate), fonts, key assignments, macros, menus, page layout, special formatting, modules and styles. Templates include general templates and specific templates. General templates contain settings that are available to all materials (for example, within a genre). Specific templates contain settings that are available only to materials relying on that template (for example, within a title). If specific material is authored using a specific template, the specific template may use the settings or content from both the specific template as well as the general template.

Graphics 485 are a collection of graphics in any relevant format that might be used in material. These may be stored in a various locations together or independently from tables or the software packages 415 resident on the system 410.

Automation programs 490 may include macros, queries, modules, or similar programming that serve to automatically boot the system, open or close applications or software programs, send or receive files, utilize information or data, or similar tasks. These programs 490 may be programmed in any number of computer languages such as VISUAL BASIC FOR APPLICATIONS™, TURBO PASCAL™, Fortran, Cobol, C, Pascal, C++, or the like. The programs 490 may also be programmed using languages specific to computer applications. These programs can perform simple or complex functions. An example of a simple function is recording the copyright date, or ISBN number of the title material authored by the system. Such information can be automatically recorded in a table or the material.

Recipients 495 may receive the output of the process in the form of material via electronic or non-electronic means or formats. For example, recipients 495 may receive a physical copy of the title material or an electronic copy of the title material.

In an embodiment, system 410 performs the automated functions shown in FIG. 1. To increase ease of operation, the contents of each of the elements in 410 may be defined prior to the operation of the system. For example, the tables may contain a variety of information including lists of genres; lists of title elements; lists of control elements such as ISBN numbers that are uniquely and sequentially assigned to the title material; blocks of text which may contain variables that need to be replaced, calculated, and/or generated during the authoring process to author complete sentences, titles or headings; endorsements, credits, and/or subtitles; images or graphics; audio or video recordings; numerical data that can be used to generate material in the title material; logical statements or computer code; common fields linking title or genre subjects to the material; field specifications for meta materials, marketing materials and control materials; and various other elements that are relied upon by the system. The information included in tables may be of a format that allows the information to be edited or transferred in electronic fashion. Similar notions pertain to templates which can contain any requisite modules, macros or content, such as boilerplate information. Modules, macros and queries may be programmed so that they can be acted upon based on the specification of the user and generate the desired result.

By using various database files 492, a title material may be generated automatically according to an embodiment of the present invention. Database files 492, including executable files, may gather materials from various sources, such as databases, database files 492, or previously authored title material, and format such material into the title material.

Figure 5:
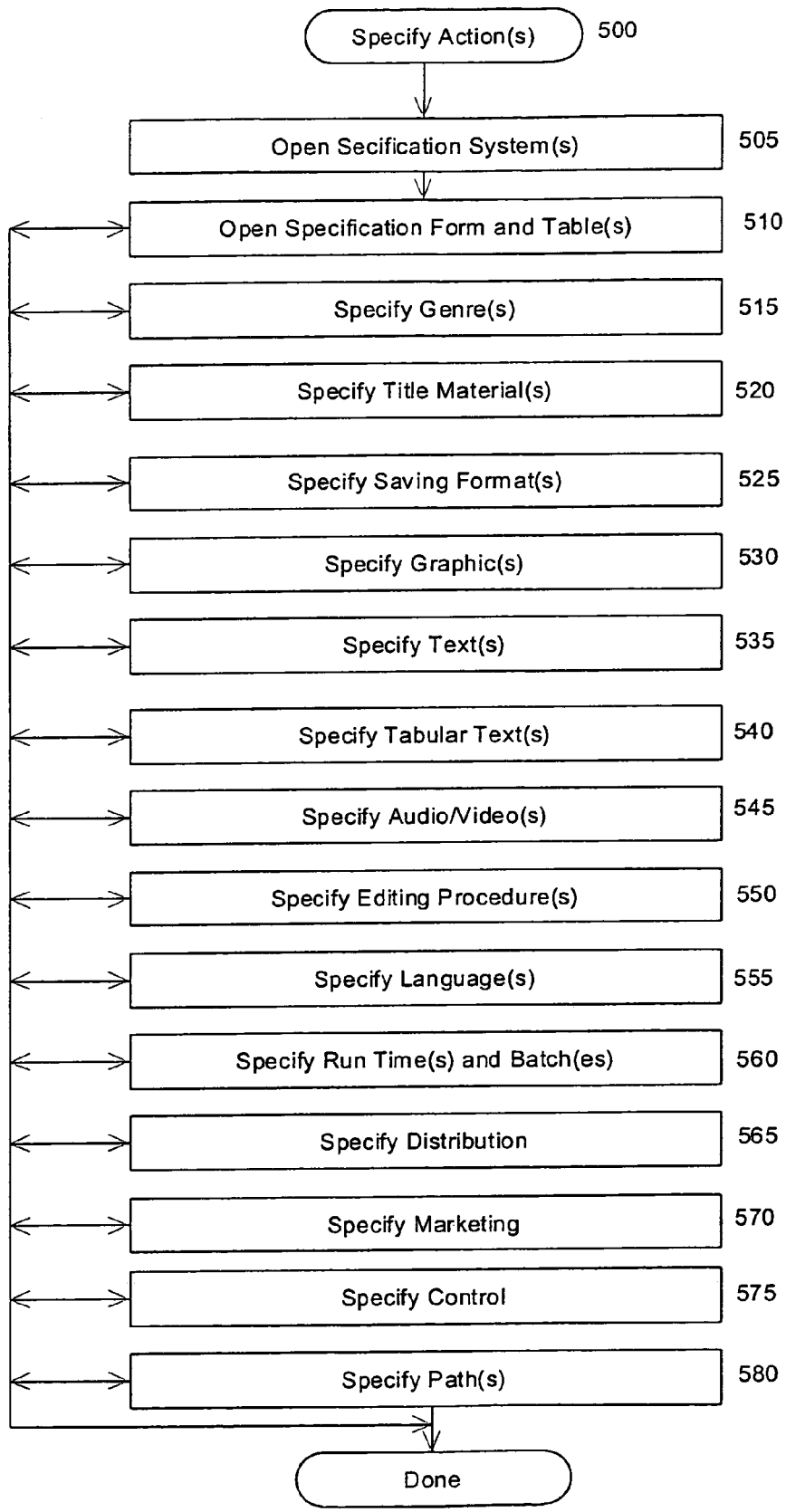
FIG. 5 illustrates a flow diagram of an embodiment of the present invention.

FIG. 5 illustrates a flow diagram of a system that allows the user to specify automated authoring, distribution, marketing and control options according to an embodiment of the present invention. Steps 510 to 580 shown in FIG. 5, illustrate various steps that a user may select to have the system of the present invention perform. These steps may occur in any order desired by the user, illustrated by the double arrows coming in and out of each of the steps 510 to 580.

In an embodiment, the computer software and hardware components as illustrated in FIG. 3 and FIG. 4, including the databases, tables, queries, modules, forms, templates and macros as shown in FIG. 4, are provided. The computer implementing this embodiment may be programmed to auto start across intervals of time or after a given number of materials are produced. The user opens a specification system 505, such as an integrated database application, and a specification form 510, such as integrated within the database.

Steps 505 and 510 may involve turning on a computer, opening database software, such as MICROSOFT ACCESS™, and opening a form, for example a form labeled "Global Reports" which reflect one or more genres of title materials or other materials that might be specified by that form. The specification form may be pre-programmed to automatically open in the auto executive function of the computer, in which case 505 and 510 may be skipped if electrical power is sufficient to proceed to step 515. Specification form 510 presents a number of options to the user, for example in the form of a single or plurality of tabs that have various selection criteria, such as selection boxes, combo boxes, list boxes, and entry boxes. Depending on the genre in question, an alternative embodiment of the invention includes default specification values organized within the specification table. If no changes in these defaults are desired, the user may skip the remaining steps as the program will automatically run using the default values. In another embodiment, a combination of default and user selected specifications may be used to eliminate some of the steps shown in FIG. 5.

In step 515, the user may choose a single or plurality of genres within which the user wishes to author and/or distribute materials. This may be accomplished in a number of ways including choosing from a list stored in a table, or presented as checked options on the entry form. For example, the user can choose amongst a list of genres such as "Country Reports", "City Reports" or "State Reports." The selection is recorded in a specification table which is later used to identify database files, procedures, modules, templates and macros that the system uses to automatically author, market and distribute materials within the genre. The choice of a specific genre may narrow the modules, macros, templates, queries, automation programs, reports and other automation systems to a given set specific to title materials, marketing materials and control materials within that genre. If more than one genre is selected, the additional genres may be addressed in a sequential batch in step 560. Genre selection may be automated if a plurality of genres are specified by default, in which case this step may be skipped. These defaults may be stored in a table.

In step 520, the user may select a plurality of title materials within the genre selected, and whether the title materials are to be processed individually or in a sequential batch. As with genres in step 515, this may be accomplished in a number of ways including but not limited to choosing from a list stored in a table, or presented as checked options on the entry form. For example, if the genre selected is "State Reports", the options presented as titles may be a list of states, such as "Alabama", "Alaska" and so on. These items may or may not be the "titles" themselves of the title material authored, but simply indicative of the title material requested. This selection may be automated if a plurality of titles are specified by default, in which case this step may be skipped. These defaults may be stored in a table. The selection is recorded in a specification table which is later used to identify database files, such as procedures, modules, templates, queries, automation programs, and/or macros, that the system uses to author, market, and/or distribute the title materials selected. An alternative embodiment of step 520 uses sub-titles, or sub-sub-titles, and so forth, which further restricts or identifies the database files, such as procedures, modules, templates, queries, automation programs, and/or macros, that the system uses to author, market, and/or distribute the title materials selected. If more than one title material is selected, these titles can be treated in a sequential batch in step 560.

In step 525, the user may select a plurality of saving formats for the materials to be processed individually or in a sequential batch. The selection choices may be visualized on a specification form using a variety of methods, including list boxes, combo boxes, or check boxes. For example, in the book publishing industry, the saving formats may include ASCII (American Standard Code for Information Interchange), MICROSOFT WORD™ or similar word processing formats, ADOBE ACROBAT™ (Adobe Systems Incorporated) or similar document formats, HTML (HyperText Markup Language), XML (EXtensible Markup Language) or similar Internet web page formats, or formats that might be proprietary or specific to a given recipient (for example, formats requiring a certain tagging or background formatting). Similar format options exist for audio or video formats [for example, NTSC (National TV Standards Committee), PAL (Phase Alternating Line), SECAM (Systeme En Couleur Avec Memoire), or other levels of resolution or sampling]. This selection may be automated if a plurality of formats are specified by default, in which case this step may be skipped. These defaults may be stored in a table. The selection is recorded in a specification table which is later used to identify procedures, modules, templates and macros that the system uses to save or archive the materials thus far selected. This step also may be used to specify formats of title materials, marketing materials, meta materials and control materials as each recipient may desire different formats.

In step 530, the user may select a plurality of graphics options for the materials requested to be processed individually or in a sequential batch. Often, within a genre or within a title, certain graphics within the title material may be desired. For example, books may include cover art or illustrations with chapters. Further, the material may be enhanced with the inclusion of maps or other graphics. As in steps 515, 520 and 525, the user may be presented with a form that displays options in the form of list boxes, text boxes, combo boxes, check boxes or similar displays. Defaults, if these exist, may be stored and accessed from tables. The graphics themselves may be stored objects in the database, or in separate storage locations. The graphics may also be programmed within modules, macros or templates which will automatically author the graphics specified, for example, if creating a market research report. For a given genre and title specification, the system may be requested to automatically author pie charts, line charts, diagrams, flow charts, scatter diagrams, pictures or similar graphics which have not been previously authored or stored. For example, a module can be specified which opens a table or portion of the title material, analyzes the contents, opens a graphics system possibly embodied in an independent graphics system, generate the graphic and place the graphic in the desired location as defined by the genre or title template. In this way, the user specifies graphics may be automatically computer generated. This selection may be automated if a plurality of graphics are specified by default, in which case this step may be skipped. The selection is recorded in a specification table which is later used to identify database files that the system uses to automatically author, distribute, and/or market the title materials selected.

In step 535, the user may select a plurality of text options for the materials requested to be processed individually or in a sequential batch. As in the four previous steps, the choice of options may be presented within a form that displays options with the use of list boxes, text boxes, combo boxes, check boxes or similar displays. Text options may include all aspects which defines the appearance of the text to the recipient, including formats, front matter, ending matter, margins, colors, animation, fonts, font sizes, heading types, and similar formatting items. In an alternative embodiment of the invention, these specifications are pre-programmed into the general and specific database files implied by the genre selection and title selection thus eliminating the need for the user to specify these text details. For example, by selecting to author a "Country Report", the system may by default proceed to use only certain document forms and templates, with predetermined modules and macros which author headings, tables of contents, and text. The system may further automatically rely on pre-determined text elements which may be stored in certain tables. This selection may be further automated if a plurality of text options are specified by default, in which case this step may be skipped. The selection is recorded in a specification table which is later used to identify database files that the system may use to automatically author, distribute, and/or market the title materials selected. Modules, queries, automation programs, and/or macros engaged by this selection may involve logical manipulations, such as the generation of variable values or the search and replacement of variable values within text contained in the database or the material so as to author original content not present in the existing database, tables, forms, modules, macros or queries or templates. Additionally, the system may alternatively include text based on probabilistic or fuzzy logic. Furthermore, as the underlying data or information in the database is updated, the regeneration of the specified text may automatically reflect the latest information or content available. Previous editions of the material can be regenerated from archived versions of the material. Thus, text may be automatically authored by the computer.

In step 540, the user may select a plurality of tabular text options for the materials requested to be processed individually or in a sequential batch. As in the previous steps, the choice of tabular text options may be presented within a form that displays options with the use of list boxes, text boxes, combo boxes, check boxes or similar displays. Tabular text options may include all aspects which defines the appearance of the tabular material to the recipient, including formats, margins, column headings, title headings, colors, calculations to be completed (for example totals, averages, or complex calculations), animation, fonts, font sizes, heading types, and similar formatting items. The selection of a tabular text options may allow for tables to be of variable or non-predetermined size and containing content or numerical values which are not present on the storage device in tables or other locations prior to the authoring of the tabular text. In an alternative embodiment of the invention, tabular text specifications may be pre-programmed into the general and specific database files by the genre selection 515 and title selection 520 and thus eliminating the need for the user to specify these text details. This selection may be automated if a plurality of table options are specified by default, in which case this step may be skipped. The selection is recorded in a specification table which is later used to identify database files that the system uses to automatically author, distribute, and/or market the title materials selected. Database files engaged by this selection may include logical manipulations, such as a search and replacement of variables, within tabular text originating from the database or the material, so as to author original content not present in existing database, its tables, forms, modules, macros or queries or templates. Additionally, the system may alternatively include text based on probabilistic or fuzzy logic. Furthermore, as the underlying data or information in the database is updated, the regeneration of the specified tabular text may automatically reflect the latest information or content available. Thus, tabular text may be automatically authored by the computer.

In step 545, the user may select a plurality of audio or video options for the materials requested to be processed individually or in a sequential batch. As in the previous steps, the choice of audio or video options may be presented within a form that displays options with the use of list boxes, text boxes, combo boxes, check boxes or similar displays. Audio and video content may be stored or indexed in tables or stored elsewhere in the storage areas, such as 355 or 350 in FIG. 3. The selection is recorded in a specification table which is later used to identify database files that the system may use to automatically author, distribute, and/or market the title materials selected. Database files engaged by this selection may permit logical manipulations, such as the qualitative editing, including the searching and replacing of content based on variables, within the audio or video content originating from the database files or the material, so as to author original content not present in the existing database files. Additionally, the system may alternatively include audio and video content based on probabilistic or fuzzy logic. Furthermore, as the underlying audio or video data or information in the database is updated, the regeneration of the specified audio or video content may automatically reflect the latest information or content available or desired. The audio or video material may be linked to each other or to textual, tabular, and/or graphical material. Such linking may allow, for example, for a visual or hearing impaired end-user to "click" on a graph, table, word, title, or icon, and "hear" or "see" the text being read. In other words, the material can be of a mixed media. Thus, audio and video content may be automatically authored by the computer.

In step 550, the user may select a plurality of editing options for the materials requested to be processed individually or in a sequential batch. As in the previous steps, the choice of editing options may be presented within a form that displays options with the use of list boxes, text boxes, combo boxes, check boxes or similar displays. Modules, macros, queries or templates engaged by this selection may permit logical manipulations, such as the qualitative editing, including the searching and replacing of content based on variables, within the unedited content originating from the database or the material, so as to author original content not present in the existing database, its tables, forms, modules, macros, queries or templates. Editing functions initiated by macros, modules, queries or templates may include the general authoring of various boilerplate content, front matter, title pages or screen, credits, endorsements, dialog formats, footer material or images, header material or images, tables of contents, indexes, spacing (temporal or physical), graphics, symbols, equations, formats, and styles. An example of a selectable editorial option may run a macro which can link written textual or tabular content to audio synthesizers, video content, audio content, or online or offline dictionaries. Furthermore, when the underlying content or information in the database is updated, the regeneration of the specified material may automatically reflect the latest information or content available or desired. Thus, edited material may be automatically authored by the computer.

In step 555, the user may select a plurality of language options for the materials requested to be processed individually or in a sequential batch. As in the previous steps, the choice of language options may be presented within a form that displays options with the use of list boxes, text boxes, combo boxes, check boxes or similar displays. Database files engaged by this selection may permit automatic translation, including the searching and replacing of content based on variables, within the non-translated content originating from the database or the material, so as to author original content not present in the existing database files. Translation functions initiated by macros, modules, queries or templates may include the translation of oral, written; and computer languages. Further, the translation of various boilerplate content, front matter, credits, endorsements, title pages or screen, footer material or images, header material or images, tables of contents, indexes, spacing (temporal or physical), graphics, symbols, equations, formats, and styles may also occur. Further, a selectable editorial option may run a macro which can linking written textual or tabular content to audio synthesizers, video content, audio content, or online or offline dictionaries. Furthermore, when the underlying content or information in the database is updated, the regeneration of the specified material may automatically reflect the latest information or content available or desired. Thus, the title material may be translated automatically by the computer.

In step 560, the user may select a plurality of run time or batch options for the title materials requested to be processed individually or in a sequential batch. The choice of run time and batching options may be presented within a form that displays options with the use of list boxes, text boxes, combo boxes, check boxes or similar displays. This selection may be automated if a plurality of run times or batch options are specified by default, in which case this step may be skipped. The selection is recorded in a specification table which is later used to identify database files that the system uses to automatically author, distribute, and/or market the title materials selected. In selecting runtime and batch options, the system can remain dormant for a period and auto start at a specified time and date. By allowing the batching of materials, the system can run almost indefinitely across a plurality of genres and titles. These options prove useful given the high-volume production potential of the present invention.

In step 565, the user may select a plurality of distribution options for the materials requested to be processed individually or in a sequential batch. The choice of distribution options may be presented within a form that displays options with the use of list boxes, text boxes, combo boxes, check boxes or similar displays. This selection may be automated if a plurality of run times or batch options are specified by default, in which case this step may be skipped. Database files engaged by this selection may permit automatic distribution to recipients, including end-users, reseller, or distributors. These options may allow the system to link a table summarizing recipient data (name, address, server address, etc.) to the material specified. This can be initiated via direct selection of tables, or the generation of tables based on keywords, or indexing systems. For example, a "Country Report" covering "Canada" may be automatically linked to a list of Canadian bookstores or electronic distributors based on a system of country codes, based on the word "Canada" being used to determine distribution channels, or based on other logical coding systems (including Standard Industrial Classification codes, Harmonization codes, ISBN codes, ISSN codes, and the like). This selection may be automated if a plurality of distribution options are specified by default, in which case this step may be skipped. The selection is recorded in a specification table which is later used to identify database files that the system uses to automatically author, distribute, and/or market the title materials selected.

In step 570, the user may select a plurality of marketing options for the materials requested to be processed individually or in a sequential batch. The choice of distribution options may be presented within a form that displays options with the use of list boxes, text boxes, combo boxes, check boxes or similar displays. This selection may be automated if a plurality of run times or batch options are specified by default, in which case this step may be skipped. The type of materials specified may be associated with a variety of database files that will result in an authoring process, in a similar fashion to the authoring of title material. This selection may be automated if a plurality of marketing options are specified by default, in which case this step may be skipped. The selection is recorded in a specification table which is later used to identify database files that the system relies upon to automatically author, distribute, and/or market the title materials selected.

In step 575, the user may select a plurality of control options for the materials requested to be processed individually or in a sequential batch. The options may be presented within a form that displays options with the use of list boxes, text boxes, combo boxes, check boxes or similar displays. This selection may be automated if a plurality of run times or batch options are specified by default, in which case this step may be skipped. The type of materials specified may be associated with a variety of database files that will result in an authoring of the control materials in a similar fashion to the authoring of title material. The materials authored can be of a tabular, textual, or graphical nature. This selection may be automated if a plurality of control options are specified by default, in which case this step may be skipped. The selection is recorded in a specification table which is later used to identify database files that the system uses to automatically author, distribute, and/or market the title materials selected.

In step 580, the user may select a plurality of path options for the marketing, distribution, and control materials requested to be processed individually or in a sequential batch. The options may be presented within a form that displays options with the use of list boxes, text boxes, combo boxes, check boxes or similar displays. This selection may be automated if a plurality of run times or batch options are specified by default, in which case this step may be skipped. The type of materials specified, or the location of a path specified, may be associated with a variety of database files. This selection may be automated if a plurality of path options are specified by default, in which case this step may be skipped. The selection is recorded in a specification table which is later used to identify database files that the system uses to automatically author, distribute, and/or market the title materials selected.

The user may elect to manually continue to execute various aspects of the system, specify more genres to be batched or processes at a later time, or leave the system which will auto-execute the processes requested at the times specified in step 560.

FIGS. 6-12 illustrate detailed flow diagrams of potential phases the system may involve in authoring, distributing, and/or marketing material according to an embodiment of the present invention. If some of the phases are not desired, they may be skipped, as seen in these flow diagrams. Further, FIGS. 6-12 show more detail to some of the steps in FIGS. 1 and 2, according to an embodiment of the present invention.

Figure 6:
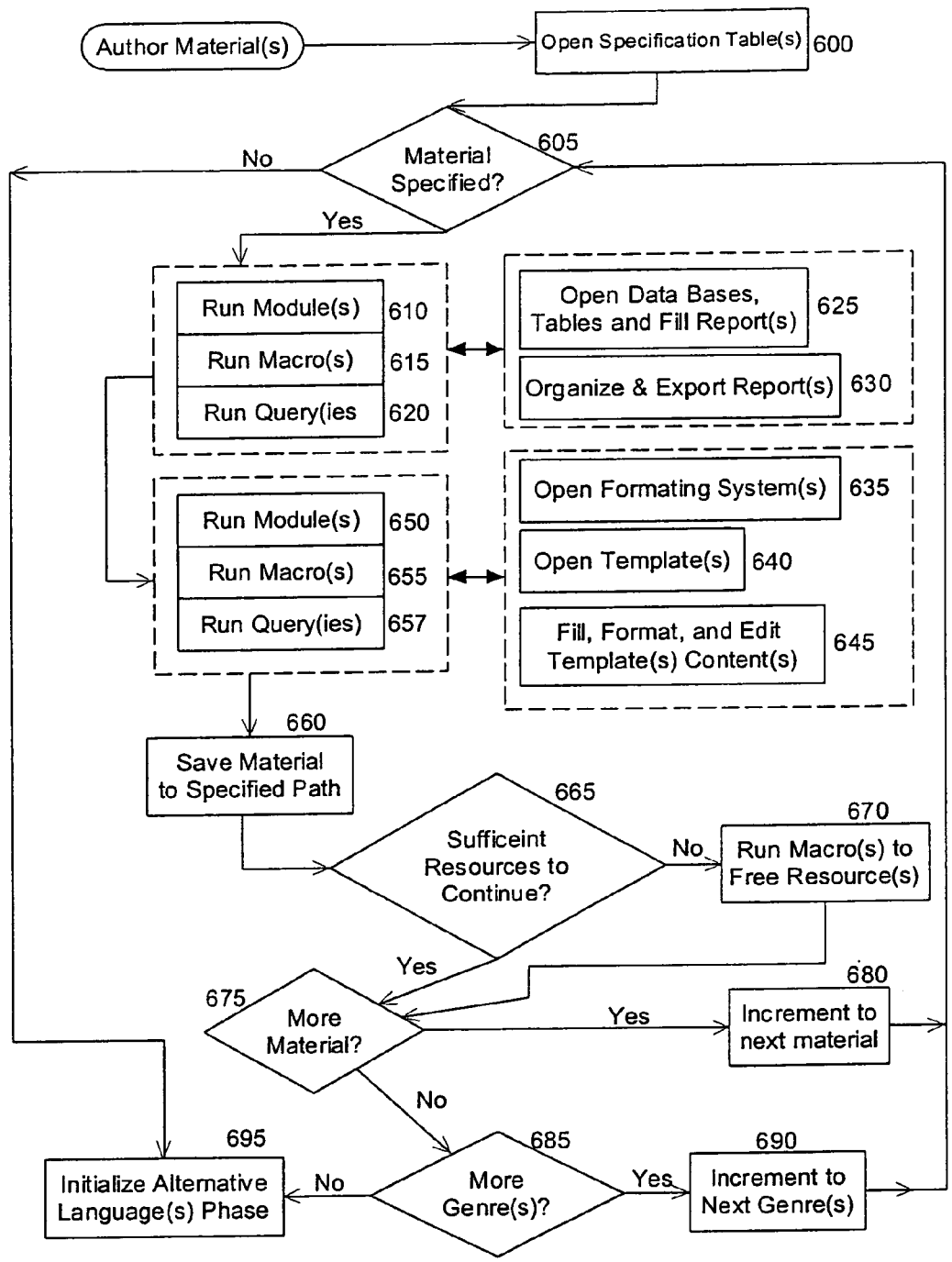
FIG. 6 illustrates a flow diagram of the automatic authoring of a title material according to an embodiment of the present invention.

FIG. 6 illustrates a flow diagram of a system which authors materials according to an embodiment of the present invention. The appropriate specification table 600 within which various default data or user defined options are specified for a given genre and materials is opened. If no material is requested at 605, the system proceeds to step 695. If material is requested to be authored, the system executes modules 610, macros 615, and queries 620 specified for the templates 480 identified for this genre.

Based on these steps, content is authored and/or collected from tables and is used to fill pre-defined reports 625. Various reports and sub-reports, as defined for a given genre, may be organized in a manner so that they are automatically formatted, edited, or embellished at 630 with additional material such as graphics, audio or video, as specified in the specification table 600. Once the report(s) are organized, these reports are formatted at 635. To perform such formatting, a pre-defined general template or specific template(s) 640 may be opened. A compiled report, which may be based on sub-reports, may contain textual, tabular, graphical, audio, or video content. The template is filled with the organized reports 630 in step 645. In steps 650, 655, and 657 modules, queries, and macros are run as specified by the user for the genre or title selected which are run on the filled templates in step 645. These modules or macros may result in editing or formatting the material, and also generating graphics, tables, linked data to a system of networked computers, copyright notices, disclaimers, credits, endorsements, and other boilerplate text. These macros are programmed to perform all of the functions of a copy editor or secretarial staff persons in a traditional publishing or media production environment.

Figure 7:
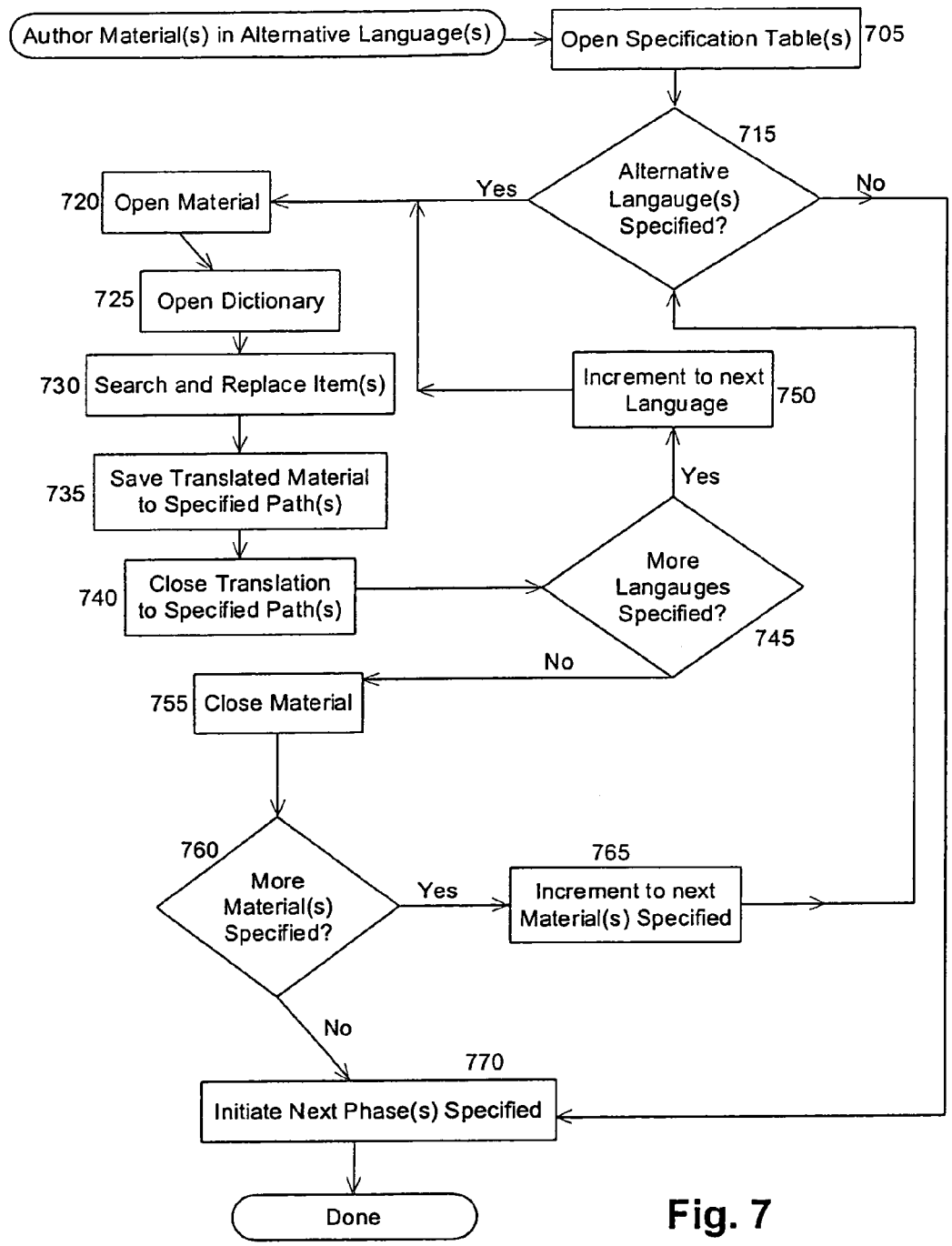
FIG. 7 illustrates a flow diagram of the automatic translating of a title material into an alternative language according to an embodiment of the present invention.

At 660, the material is saved to a path specified in the specification table opened in step 600. If system resources are insufficient to continue 665, such as because of lack of system resources or memory, in step 670 an automated program frees the systems resources or alternatively notifies the user. In step 675, the system checks to see if more materials within the genre are in the batch and, if so, the system increments in step 680 to the next item in the batch, thus creating more material in the same genre. This procedure continues until the materials specified within the specification table 600 are authored. In step 685, the system checks to see if more genres and materials are in the batch and, if so, it increments in step 690 to the next item, thus creating more material in the next genre in the batch. This procedure continues until the genres specified in the specification table 600 are reviewed. In step 695, the system continues to the alternative language phase, which is shown in FIG. 7. Alternatively, the system may continue to any of the phases described herein, such as described in the specification table. An alternative embodiment of the present invention would allow the system to batch to other phases of the automation process for a given material before incrementing to the next title in step 680, or the next genre in step 690. In this way, a given title can pass to any or all of the phases shown in FIGS. 1 and 2 before the process increments to the next title in the batch. Similar alternative embodiments exists for all of the phases illustrated in FIGS. 1 and 2. In an alternative embodiment, once the material is automatically authored, additional content may be manually added to the material. Thus, the material authored can comprise original text, graphics, audio, video, or the like that was not present in the database files from which the material was derived. Additionally, while the system authors the material, the material may be temporarily stored in RAM or other storage devices.

FIG. 7 illustrates a flow diagram of a system which translates and saves material or title materials in alternative languages according to one embodiment of the present invention. The present invention is language neutral in that the databases, templates, tables and resulting content may exist in any written, spoken, or computer language. In one embodiment of the invention, it may be desirable to author material that is translated from a first language into a second language that may nor may not had been represented in the database, tables, templates or original content. In an embodiment, automatic translation of existing material occurs by first opening the specification table in step 705. If no additional language is specified in the specification table at 715, the system proceeds to step 770. Otherwise, the system opens the source material to be translated in step 720. It then opens a dictionary table in step 725, for which the phrases, labels, and content in the source materials have translations. In an embodiment of the present invention, the system relies on exact translations which appear in the dictionary table.

Figure 8:
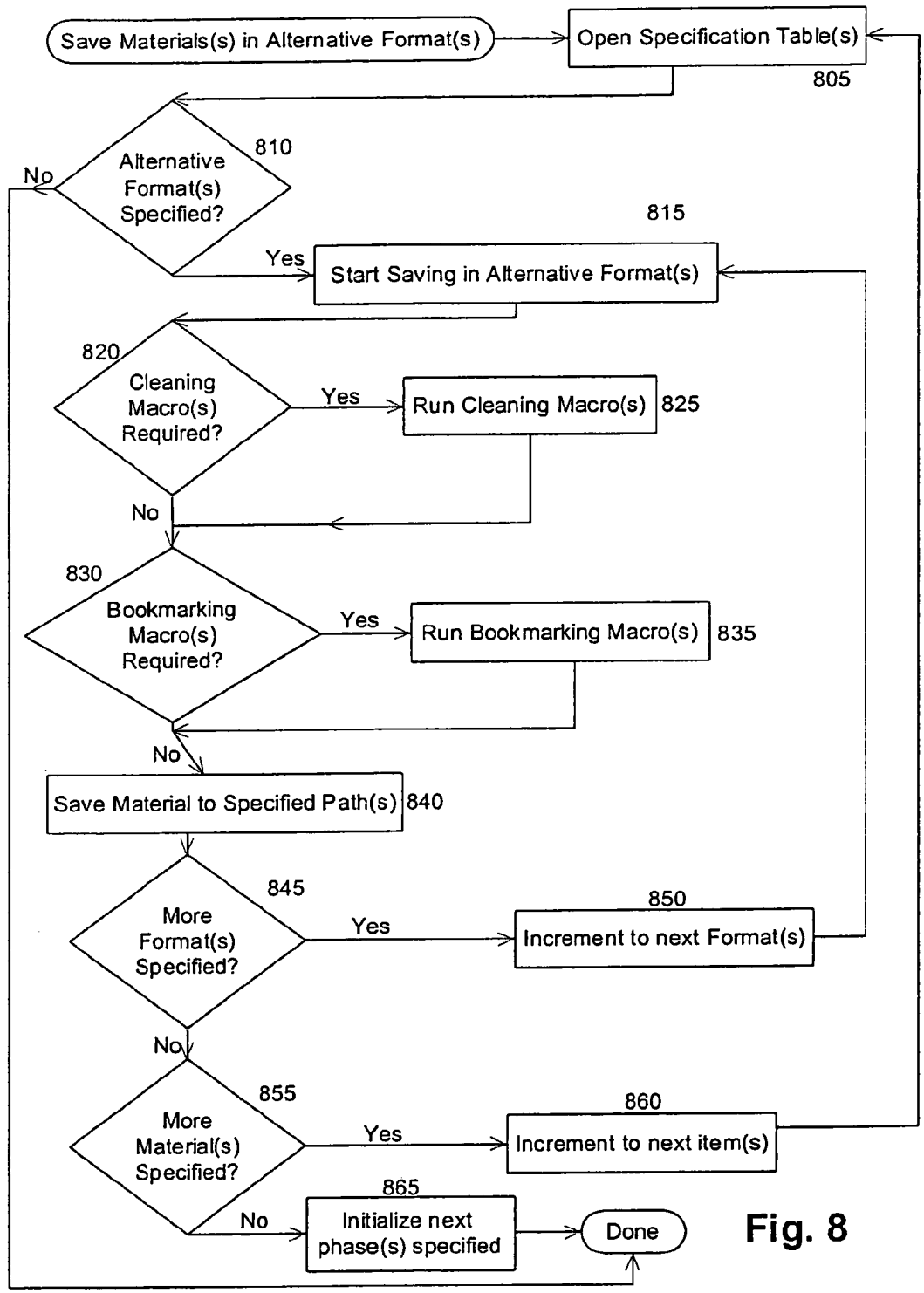
FIG. 8 illustrates a flow diagram of the automatic saving of a title material in alternative formats according to an embodiment of the present invention.

In step 730, the system increments across the phrases, sentences, quotations, labels, comments and/or strings of information in the source materials performing search and replace for each phrase in the dictionary. In step 735 the system saves the translated title material on the computer in the appropriate path under an appropriate name so as to avoid, if desired, overwriting the original content. In step 740, the system automatically closes the translated material (s). In step 745, if more languages are specified, the system proceeds to step 750 and increments to the next language specified. The system then returns to step 720 (or alternatively step 730 if the material and the dictionary are already open) which starts the translation process over for the same source material into a third language, and so on. If no additional languages remain in the batch, the system then closes the source material at 755, and proceeds to step 760 which determines if there are more material(s) to be translated. If more material is to be translated, the system proceeds to step 765 and increments to the next material specified in the batch and restarts the process at step 715. If no material remains in the batch to be translated, as determined by step 760, the system initiatives the alternative format phase 770, which is shown in FIG. 8. Alternatively, the system may continue to any of the phases described herein, such as described in the specification table.

In an alternative embodiment, the system re-authors the material from tables and forms, which are a pre-translated version of the original files, tables or forms. In another embodiment, any preexisting work may be translating into an alternative language using the system of the present invention. Accordingly, in an embodiment of the present invention, material does not have to be authored by the present invention to be translated by the present invention, as described herein.

Figure 9:
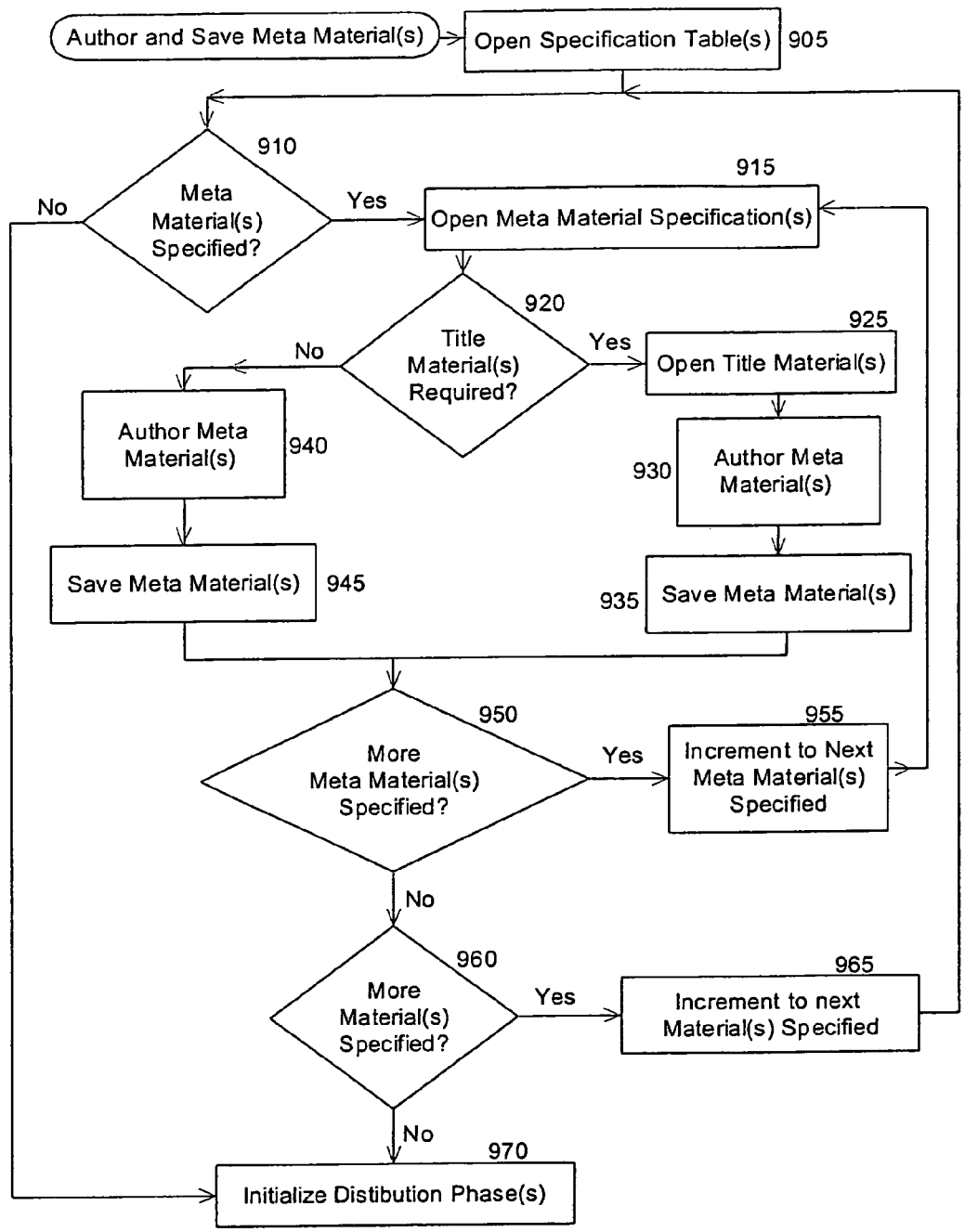
FIG. 9 illustrates a flow diagram of the automatic authoring of meta material according to an embodiment of the present invention.

FIG. 8 illustrates a flow diagram of a system which saves material in alternative formats according to one embodiment of the present invention. In step 805, the system opens the specification table. The system determines if alternative formats are requested at 810. If no alternative formats are specified, the system proceeds to step 865. If alternative formats are specified, the system starts with the first item of material in the batch and starts the saving process in step 815. In step 820, the system determines if a cleaning macro is desired for the format requested. If such a cleaning macro is desired, the cleaning macro is performed in step 825. A cleaning macro typically will re-edit the material in such a way that graphics, text, tables, hyperlinks, video, or audio components of the material when saved in an alternative format has an acceptable appearance, style, sound, design, and/or format. The alternative formats that content might be saved in include popular word processing formats, such as a MICROSOFT WORD™ document format, ASCII format, HTML, XML or related Internet formats, portable document formats, such as the PDF file format, graphics formats, audio formats, or other computer file formats desired by the user. In step 830, the system determines if the material needs to be bookmarked, as might be desired by certain recipients. If so, the system proceeds to step 835 and a macro is run to bookmark the material with the format specified. The system proceeds to step 840, which electronically saves the material in the appropriate path. In step 845, if more formats are specified, the system proceeds to step 850 which increments the procedure to the next specified format and the system restarts at step 815. If there are more material(s) specified, the system increments to the next item in the batch 860 and proceeds to step 805. This system continues until all material requiring alternative formats are saved in the appropriate formats. After completion of step 865, the system initiatives the meta material phase, which is shown in FIG. 9. Alternatively, the system may continue to any of the phases described herein, such as described in the specification table.

Figure 10:
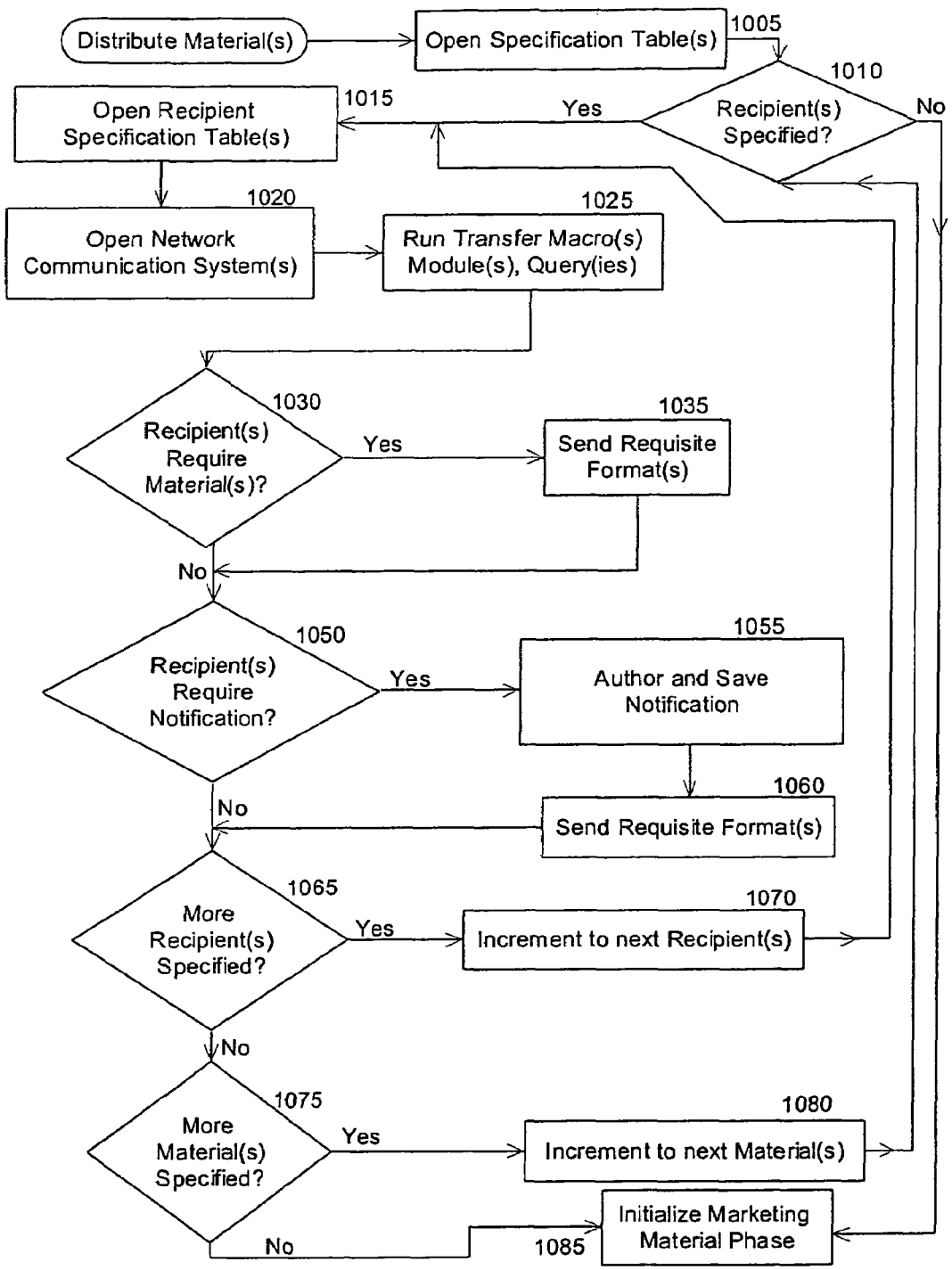
FIG. 10 illustrates a flow diagram of the automatic distribution of material according to an embodiment of the present invention.

FIG. 9 illustrates a flow diagram of a system which authors and saves meta materials according to one embodiment of the present invention. Step 905 opens the specification table. In step 910, the system determines whether meta materials have been specified. If no meta materials have been specified, the system continues to step 970. If meta materials have been specified, the systems continues to step 915 and opens up a table defining the meta materials specification. For each potential recipient, this table defines the content requested by the recipient. The system proceeds to determine whether some of the specified content relies on the actual content of the title material at 920. If so, then the system proceeds to step 925 and opens the title material at 930 and to step 935 where pre-defined database files, such as modules, queries, automation programs, and/or macros, author the desired meta materials, which is shown in FIG. 6. If the title material is not needed, the system proceeds to step 940 where pre-defined database files author the desired meta materials, which is shown in FIG. 6. In either step 930 or 940, the requirements of the recipient are programmed into database files, such as modules, queries, automation programs, and/or macros, which author the meta materials by drawing upon the existing title material or on, the database files, including those which were used to author the title material. After the meta materials are authored, the system proceeds to steps 935 or 945, respectively, and electronically saves the meta materials. If additional saving formats are desired, the system may have had such formats authored as shown in FIG. 8. Alternatively, the system may save the meta material in the various formats at this step. The desired formats may appear in the specification table. At step 950, the system determines if more meta materials are specified for the same or additional recipients. If so, the system increments in step 955 to the next meta material specified and restarts the process at step 915. If no further meta material are specified as determined in step 950, the system determines if more material is specified at 960. If more materials are specified, the system increments to the next material at 965 and returns to step 910. If no more materials require meta materials, the system proceeds to step 970 and initializes the distribution phase, as shown in FIG. 10. Alternatively, the system may continue to any of the phases described herein, such as described in the specification table.

Figure 11:
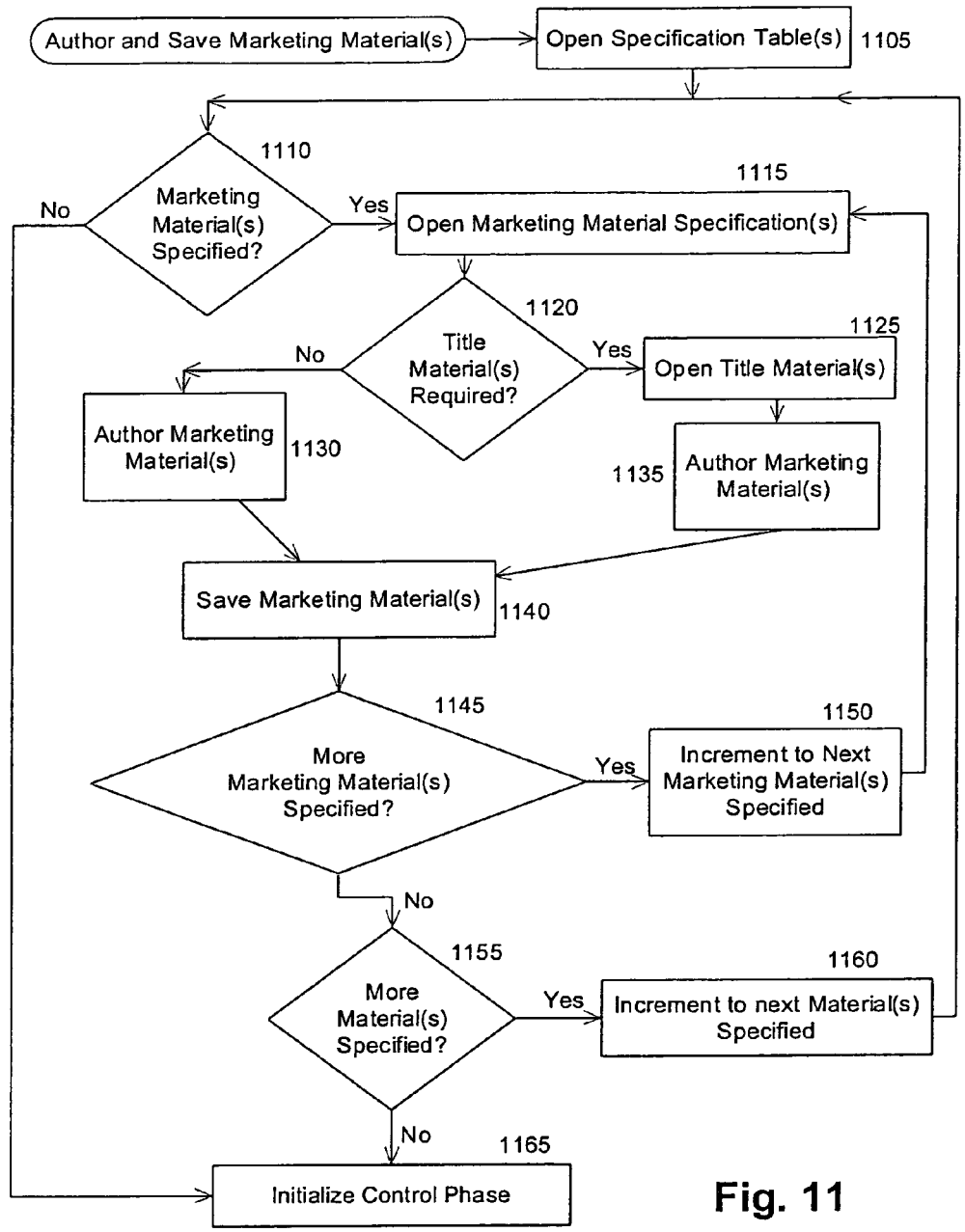
FIG. 11 illustrates a flow diagram of the automatic authoring of marketing material according to an embodiment of the present invention.

FIG. 10 illustrates a flow diagram of a system which distributes materials according to an embodiment of the present invention. In step 1005, the system opens the specification table. At 1010 the system determines if recipients are specified. If no recipients are specified, the system proceeds to step 1085. Alternatively, if no recipients are specified, the system may prompt for a recipient to be entered or alternatively confirm that no recipients are to be entered. If recipients are specified, at step 1015 a recipient specification table is opened. The fields in this table may include recipient contact information (such as name, address, telephone number fax number, email address, and the like), server addresses, server log-in name, server password, and other file transfer protocol settings, such as mode of transfer (e.g., binary), form of log in (e.g., anonymous), and the like. In step 1020, the system opens the network communications system software 440, as shown in FIG. 4. The system then runs a module or macro that automates the network communications system software which may transfer the requisite material specified in the specification table to the specified recipient. The system proceeds to step 1030 and determines if the recipient should receive the material. If so, the system sends the material in step 1035. The material may include title, marketing, meta, or control material authored, saved, or translated during other phases of the system. Step 1050 determines if the recipient desires notification of materials having been sent as recorded in the specification table. Such notification may be send via telephone, fax, email, or other forms of sending notification at 1060. If such notification is desired, the procedure runs a notification macro at 1055, which may include the automatic authoring of the notification, such as sown in FIGS. 6, 7, and 8. For example, if an email notification is desired, the email may be automatically authored and sent. Additionally, the notification may be sent in various languages or in various formats. Once the notification is authored in step 1055 and sent in step 1060, the system proceeds to step 1065 and determines if more recipients are specified. If more recipients are specified, step 1070 increments to the next recipient and proceeds to step 1015. If no more recipients are specified, the system then determines if more materials, such as additional title materials, are to be sent at 1075 and if so, the system increments through the material at 1080. If no more material is specified in the batch, the system continues to step 1085 and initializes the marketing material phase, which is shown in FIG. 11. Alternatively, the system may continue to any of the phases described herein, such as described in the specification table.

FIG. 11 illustrates a flow diagram of a system which authors and saves marketing materials according to an embodiment of the present invention. FIG. 11 is similar to FIG. 9, which describes a system which authors and saves meta materials. One difference between FIGS. 9 and 11 is the qualitative output of the systems. In the case of meta materials, as shown in FIG. 9, the output is typically tabular information and graphics, such as cover art which may be extracted from the title material or related databases. The format of the meta materials may be standard spreadsheet formats (e.g., MICROSOFT EXCEL™, LOTUS 1-2-3™ (Lotus Development Corporation), or similar spreadsheets), ONIX (ONline Information EXchange), tagged ASCII, advise forms, or similar formats. Marketing materials may have formats that are readily useable for marketing and promotion purposes by the publisher or resellers. The database files used in authoring marketing materials are generally more complex than the ones used for meta materials.

Step 1105 opens the specification table. In step 1110, the system determines whether marketing materials have been specified. If no marketing materials have been specified, the system continues to step 1165. If marketing materials have been specified, the systems continues to step 1115 and opens up a table defining the marketing materials specification. For each potential recipient, this table defines the marketing material desired by the recipient(s). The system proceeds to step 1120 to determine whether some of the specified content relies on the actual content of the title material. If so, then the system proceeds to step 1125 and opens the title material and at 1135 authors the desired marketing material using, for example, pre-defined database files, such as shown in FIGS. 6 and 7. If the title material is not needed to author the marketing material, then the system proceeds to step 1130 where pre-defined database files author the desired marketing materials, such as shown in FIGS. 6 and 7. In either step 1130 or 1135, the desired marketing material of the recipient are programmed into database files, such as modules, queries, automation programs, and/or macros, which authors the desired marketing materials by drawing upon the existing title material or on the database files, including those which were used to author the title material. After the automated authoring of marketing materials is complete, the system proceeds to steps 1140 and saves the marketing materials in a default format to the appropriate path. If additional saving formats are desired, the system may author these formats as shown in FIG. 8. Alternatively, the system can save the materials in the desired formats at this point. In an alternative embodiment of the present invention, the marketing materials may be automatically translated into additional languages, as described in FIG. 10.

Figure 12:
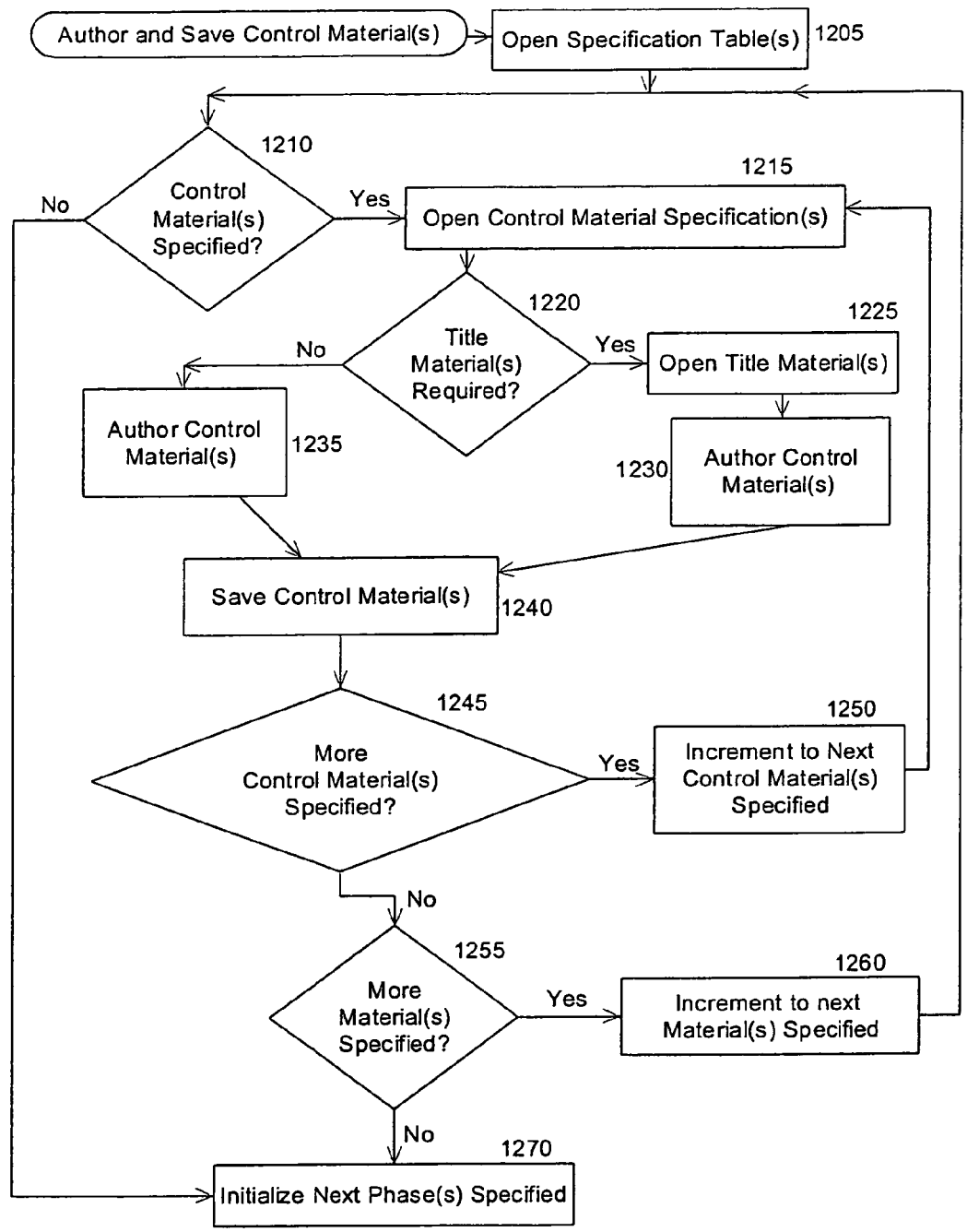
FIG. 12 illustrates a flow diagram of the automatic authoring of control material according to an embodiment of the present invention.

In step 1145, the system determines if more marketing materials are specified for the same or additional recipients. If more materials are specified, then the system increments in step 1150 to the next marketing material specified and restarts the process at step 1115. If no further marketing materials are specified as determined in step 1145, the system then determines if more title material is to have marketing materials at 1155. If more title material is to have marketing material, the system increments to step 1160 and proceeds to 1115. If no more title materials is to have marketing materials, the system proceeds to step 1165 and initializes the control phase, as shown in FIG. 12. Alternatively, the system may continue to any of the phases described herein, such as described in the specification table.

FIG. 12 illustrates a flow diagram of a system which authors and saves control materials according to an embodiment of the present invention. FIG. 12 is similar to FIGS. 9 and 11, with one difference being the material authored. In this system, the material being authored is generally not of relevance to the distribution or promotion of the title material. Rather, the information concerns matters of internal control, such as which entities are to receive the title material, when was the title material authored, and information about the title material that may be directly relied upon by accounting departments, sales departments and others within a publishing or media production company.

Step 1205 opens the specification table. In step 1210, the system determines whether control materials have been specified. If no control materials were specified, the system continues to step 1270. If control materials were specified, then the systems continues to step 1215 and opens up a table defining the control materials specification. For each potential recipient, this table defines the material desired by the recipient. The system then proceeds to step 1220 and determines whether some of the specified content relies on the actual content of the title material. If so, then the system proceeds to step 1225 and opens the title material and then to 1130 where pre-defined database files author the desired control materials, such as shown in FIGS. 6 and 7. If not, then the system proceeds to step 1235 where pre-defined database files author the desired control materials, such as shown in FIGS. 6 and 7. In either step 1230 or 1235, the control materials are authored, such as by using database files that author control materials by drawing upon the existing title material or upon other databases. After the automated authoring of control materials is complete, the system proceeds to steps 1240 and saves the control materials in a default format to the appropriate path. If additional saving formats are desired, the system may have authored these formats as shown in FIG. 8. Alternatively, the system can save the control materials in the desired formats at this point. In step 1245, the system determines if more control materials are specified for the same or additional recipients. If so, then the system increments in step 1250 to the next control material specified and restarts the process at step 1215. If no further control materials are specified as determined in step 1245, the system determines if more title material is specified in step 1255. If more title material is specified, the system increments at step 1260 to the next title material and proceeds to step 1210. If no more title materials require control materials, the system proceeds to step 1270 and to additional phases specified in the specification table.

The specification table used for the title material may include instructions to skip any of the phases described in FIGS. 6-12. If the specification table includes such instructions, then such phases may be skipped and the system may proceed to the next phase. Moreover, the specification table may include additional phases, if desired by user, to perform any additional authoring, distribution, or marketing tasks.

Figure 13:
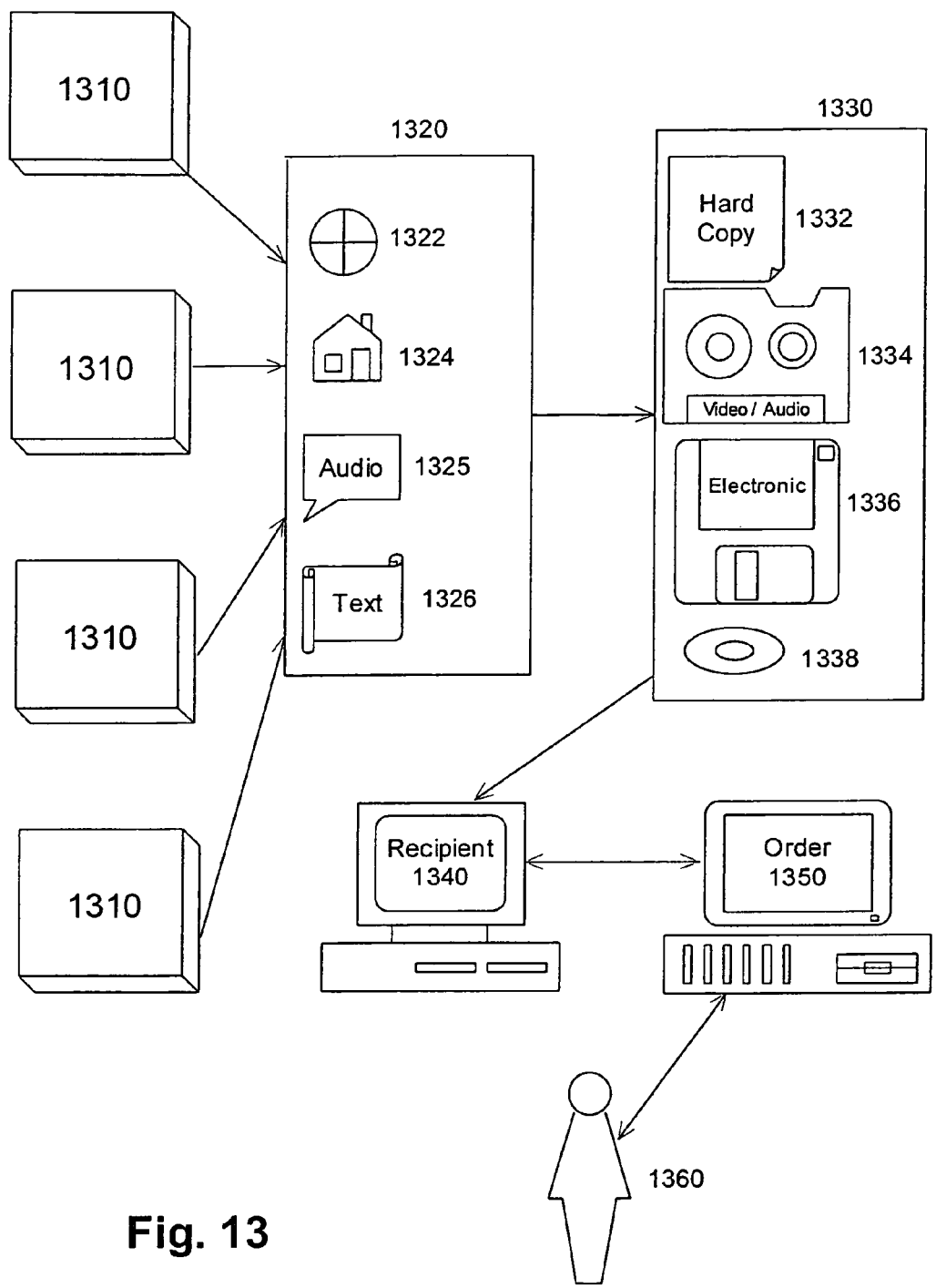
FIG. 13 illustrates an overview of an embodiment of the present invention.

FIG. 13 illustrates an overview of an embodiment of the present invention. The present invention may be implemented using a computer to automatically perform the desired steps. The computer automatically authoring a title material that is derived from at least one database file 13 10 using an automation program, macro, or module, or other such methods, as described herein. In an embodiment; a plurality of database files 1310 is used. Moreover, the system may be setup to run automatically the present invention as soon as power is provided to the computer.

The material from the database files 1310 is provided in a format 1320. The material may comprise graphs 1322, graphics or videos 1324, audio 1325, text 1326, computer instructions or any other such information. The system automatically formats the material into a desired format 1320. The desired formats may have been previously selected by the user, or may be a default format. The format may be hard copy 1332, video or audio 1334, electronic 1336, or various other file formats 1338. Additionally, the system may author multiple title materials, such as multiple title materials in a genre. Further, the system may save the title material into more than one language.

The system generates meta material, marketing material, and control material and may send these to recipient 1340. If, for example, recipient 1340 is a distributor, recipient 1340 may utilize a second computer to sell the title materials over a system of networked computers, such as the Internet. Alternatively, such a recipient may distribute the title materials in a store or other physical place of business. The end-user may order a title material from a recipient 1340 that is a distributor. An end-user may browse through the title materials 1350 electronically over the system of networked computers or physically in a store. The end-user is then sent the title material 1360 by the recipient. Alternatively, the end-user may directly order the title material from the user of the present invention. The end-user may receive the title material over the system of networked computers, receive it electronically via a computer file, physically receive the title material in person or through the mail, or the like.

In one embodiment of the present invention, the authoring and marketing process may be accomplished with a single or plurality of computer users using a single or plurality of computers. Additionally, in an embodiment of the present invention, a publisher avoids the traditional costs of authors, editorial staff, graphics and printing personnel, translators, and marketers. Further, in another embodiment, a plurality of title materials in any language may be authored and marketed at negligible costs thus allowing the publisher to author title materials of interest to a very small or narrow readership base which may otherwise be uneconomical to serve. In another embodiment, a publisher may author, market and distribute high-volumes of title materials in a significantly reduced amount of time.

In another embodiment of the present invention, material may be authored, distributed, and/or marketed by a user that does not necessarily have expertise in: the subject or content of the title material; the written language of the title material; in the various facets of the editorial process including copy editing, format editing, and graphic design processes; in the authoring of marketing materials or the marketing of the title materials; or in the various facets of electronic distribution of materials. In another embodiment of the present invention, the publisher need not have a physical presence where the title materials, meta materials, control materials and/or marketing materials are produced.

Once the user has defined the single or plurality of title materials to produce, with associated marketing materials, control materials, meta materials, written languages, and distribution destinations, the user may choose to no longer intervene or be involved in the authoring, distribution, and/or marketing process. At the end of this operation, the specified materials in one or a plurality of volumes will have been written, formatted, saved in a plurality of formats and written languages, and also indexed, catalogued and distributed. Furthermore, marketing materials and descriptive meta materials will have been produced in a plurality of forms and distributed and/or sold to relevant parities, for example via electronic transmission, such as to computers hosting various web sites and/or cable television systems for selling such title materials.

Additionally, an embodiment of the present invention allows for the authoring of title materials of a complex nature, including, but not limited to, title materials that require the reporting of numerous numerical and complex computer calculations or graphics presentations and title materials that are customized to an individual recipient or a plurality of recipients whose small numbers might not make the authoring and marketing of title materials economically viable.

In an embodiment of the present invention, selections desired by a user may be made in forms. The forms may present a number of options to the user, such as with tabs that have various boxes, selection criteria and entry forms. For example, the user may choose a single or plurality of genres or classifications of publication to be executed in batch processes. Within each genre, the user may select one or a plurality of title materials, to be automatically written as specified by that genre's modules, macros, queries, data bases and correspondence tables. Further, the user may be presented with a number of default and alternative options governing various aspects of the title material authoring process. For example, the user may choose amongst a single or plurality of languages, formats, paragraphs to be included or excluded, headings to be included, various editorial defaults, graphics to be included, or subject coverage. The user may then select the marketing materials to be authored for the title materials in question. The user may also select which recipients are to receive the title material in the appropriate format and resulting meta materials, or the marketing materials in electronic or non-electronic format. After this selection process, the computer authors the title materials specified in the format and languages specified, authors the marketing materials and meta materials, and executes the transmission requests for the title material, meta material, marketing material, and control material via the system of networked computers or similar telecommunications methods.

After the one or plurality of computers has completed the requested actions. The user is free to make a plurality of similar requests including different genres, or, within the same genre, different titles. In case an order is received for a particular version of the title material and, in the interim, the core modules, databases, correspondences, or dictionaries have been modified, the user may run the most recent edition by selecting only the title material requested which will be automatically authored in its latest version and will thus be available for distribution and marketing. Therefore, by allowing the title material to be authored each time a recipient requests a title material, the latest material may be used to author this title material.

Furthermore, the automatic authoring, editing, translating, marketing and fulfillment process of an embodiment of the present invention allows the automatic authoring of: title material that does need traditional labor intensive steps, such as copy editing, graphic design, format editing, or similar processes; title materials in a plurality of languages other than the original title material; creating marketing and promotional materials for the title materials; automatic distribution of title materials, descriptive meta materials, and marketing materials to electronic sellers; automatic cataloguing of the title material; automatic indexing of the of title material; automatic updating of title materials which may be made available on demand; automatic matching of title materials to distribution meta materials and marketing materials so as to lower the costs of marketing and for the distribution of title materials to the appropriate channels of distribution, target audiences, title material end-users, or sellers; and automatic authoring of title material of a high level of complexity in terms of calculations or graphics.

Examples of where the invention may be used to drive down the costs of authoring and marketing while increasing the speed of authoring and marketing, by exploiting a core database, correspondences, known relationships, or dictionaries include the automatic authoring and/or marketing of, for example: country studies; regional studies; city studies; state studies; geographic studies; industry studies; political studies; demographic studies; scientific studies; company financial assessments; company labor productivity assessments; strategic planing studies; regulatory compliance documents; consulting reports; product market studies; management practice studies; directories; trade reports; government announcements, reports, or studies; training manuals; medical, legal or professional documents or reports; examination preparation materials; pedagogical, education or study materials; reference books, studies or reports; newsletters, journals, magazines, and newspapers of periodic nature; non-fictional works based on market and/or consumer databases; non-fictional works based on company, country, product, and/or consumer databases; non-fictional works based on databases covering individuals; editions of classic literature combined with computer written content analyzes; fictional works based on genre, language corpus, and various additional attributes; works automatically translated or reformatted from their original version; continually updated title material; video material; software; audio material; and the like.

All patents and publications described herein are hereby incorporated by reference to the same extent as if each individual patent or publication was specifically and individually indicated to be incorporated by reference.

From the description of the invention herein, it is manifest that various equivalents can be used to implement the concepts of the present invention without departing from its scope. Moreover, while the invention has been described with specific reference to certain embodiments, a person of ordinary skills in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many equivalents, rearrangements, modifications, and substitutions without departing from the scope of the invention.

What is claimed is:

1. A computer-based method of creating original works of authorship, comprising the steps of:
    A) receiving an indication of at least one selected genre of title materials;
    B) opening at least one specification table for the selected at least one genre, wherein said specification table specifies at least one of various default data options and user defined options associated with the selected at least one genre; and
    C) running at least one of a module, macro and query identified in the specification table to automatically author title material in the selected at least one genre, wherein the running at least one of a module, macro and query includes:
        (1) opening databases identified in the specification table;
        (2) populating data from said databases into at least one of tables, graphics, text and reports using at least one template associated with said selected at least one genre; and
        (3) organizing at least one of said tables, graphics, text and reports for at least one of: formatting, editing, and embellishing with additional materials as associated with said selected at least one genre; and
    D) saving the title material resulting from said previous steps A) through C) to a path specified in the specification table.

2. A computer-based method of creating original works of authorship in accordance with claim 1, further comprising the step of determining whether more material is to be authored, and if so, repeating steps C and D.

3. A computer-based method of creating original works of authorship in accordance with claim 1, further comprising the step of determining whether another genre has been selected and, if so, repeating steps B, C and D.

4. A computer-based method of creating original works of authorship in accordance with claim 1, further comprising the step of translating the title material of step D into an alternative language.

5. A computer-based method of creating original works of authorship in accordance with claim 4, wherein said step of translating the title material of step D into an alternative language includes specifying an alternative language; accessing a translation dictionary that has translation of words and phrases from the original language of the title material into the specified alternative language, searching and replacing words and phrases of the original title material with words and phrases found in the translation dictionary; and saving the translated title material.

6. A computer-based method of creating original works of authorship in accordance with claim 1, further comprising the step of convening the title material of step D into an alternative format.

7. A computer-based method of creating original works of authorship in accordance with claim 6, wherein said step of converting the title material of step D into an alternative format includes at least one of running a cleaning macro to edit the title material to be in a suitable form for the alternate format, book-marking the title material, and saving the title material in the alternate format.

8. A computer-based method of creating original works of authorship in accordance with claim 1, further comprising the step of providing meta materials based on said title material of step D.

9. A computer-based method of creating original works of authorship in accordance with claim 8, wherein said step of providing meta materials includes opening a meta material specification table and running at least one of modules, queries, and macros on said title materials using said meta data material specification table to provide meta materials.

10. A computer-based method of creating original works of authorship in accordance with claim 8, wherein said step of providing meta materials includes opening a meta material specification table and opening predefined databases using said meta data material specification table to provide meta materials.

11. A computer-based method of creating original works of authorship in accordance with claim 1, further comprising the step of providing marketing materials reflecting said title material of step D.

12. A computer-based method of creating original works of authorship in accordance with claim 11, wherein said step of providing marketing materials reflecting said title material of step D includes opening a marketing material specification table and running at least one of modules, queries, and macros on said title material using said marketing material specification table to provide marketing materials.

13. A computer-based method of creating original works of authorship in accordance with claim 11, wherein said step of providing marketing materials includes opening a marketing material specification table and opening predefined databases using said marketing material specification table to provide marketing materials.

14. A computer-based method of creating original works of authorship in accordance with claim 1, further comprising the step of providing control materials associated with the title material of step D, wherein said control materials is useful in controlling, tracking, indexing and accounting for the title material.

15. A computer-based method of creating original works of authorship in accordance with claim 14, wherein said step of providing control materials associated with said title material of step D includes opening a control material specification table and running at least one of modules, queries, and macros on said material using said control material specification table to provide control materials.

16. A computer-based method of creating original works of authorship in accordance with claim 14, wherein said step of providing control materials includes opening a control material specification table and opening predefined databases using said control material specification table to provide control materials.

17. A computer-based method of creating and distributing original works of authorship, comprising the steps of:

creating original works of authorship in accordance with claim 1; and distributing said title material including the steps of: specifying a list of recipients from user input or a distribution specification table; and transferring the title material over a communications network.

* * * * *